US011924599B2

(12) United States Patent
Kuraoka et al.

(10) Patent No.: US 11,924,599 B2
(45) Date of Patent: Mar. 5, 2024

(54) HEADSET AND EAR PAD

(71) Applicant: PANASONIC INTELLECTUAL PROPERTY MANAGEMENT CO., LTD., Osaka (JP)

(72) Inventors: Shinji Kuraoka, Fukuoka (JP); Reo Takiguchi, Fukuoka (JP); Hirotaka Fukutsuka, Fukuoka (JP)

(73) Assignee: Panasonic Intellectual Property Management Co., Ltd., Osaka (JP)

(*) Notice: Subject to any disclaimer, the term of this patent is extended or adjusted under 35 U.S.C. 154(b) by 210 days.

(21) Appl. No.: 17/545,510

(22) Filed: Dec. 8, 2021

(65) Prior Publication Data

US 2022/0353596 A1 Nov. 3, 2022

(30) Foreign Application Priority Data

Apr. 30, 2021 (JP) ................................ 2021-077917

(51) Int. Cl.

*H04R 5/033* (2006.01)
*H04R 1/10* (2006.01)
*H04R 1/08* (2006.01)

(52) U.S. Cl.

CPC ........... *H04R 1/1008* (2013.01); *H04R 1/105* (2013.01); *H04R 1/1058* (2013.01); *H04R 1/08* (2013.01)

(58) Field of Classification Search

CPC .... H04R 1/1008; H04R 5/033; H04R 5/0335; H04R 2201/107; H04R 2460/09; H04R 2460/11

See application file for complete search history.

(56) References Cited

U.S. PATENT DOCUMENTS 3,798,393 A * 3/1974 Gorike ................. H04R 1/1008 381/372
4,058,688 A * 11/1977 Nishimura ........... H04R 1/1008 381/372
8,199,955 B2 * 6/2012 Akino .................. H04R 1/1008 381/387
10,149,033 B2 * 12/2018 Karacal .................. H04R 1/105
10,165,344 B2 * 12/2018 Imai ..................... H04R 1/1008
10,327,055 B2 * 6/2019 Peeters ................ H04R 1/1075
10,484,772 B2 * 11/2019 Barrieau .............. H04R 1/1008
10,536,763 B2 * 1/2020 Slater ................... H04R 1/1041
10,623,847 B2 * 4/2020 Jiang .................... H04R 1/1075
10,959,005 B2 * 3/2021 Yoneyama ........... H04R 1/1075
10,999,672 B2 * 5/2021 Shen .................... H04R 1/2849

(Continued)

FOREIGN PATENT DOCUMENTS

GB 2570123 A * 7/2019 ........... H04R 1/1008
JP S58-5637 B2 2/1983

(Continued)

*Primary Examiner* — Ryan Robinson

(74) *Attorney, Agent, or Firm* — Seed IP Law Group LLP

(57) ABSTRACT

A headset includes: a housing provided at one end portion of a headband; a boom main body attached to the housing; and an ear pad attached to the housing on a side opposite to the boom main body. The ear pad includes a cup portion configured to cover an entire auricle of a wearer when the entire auricle is inserted into an inner diameter portion of the cup portion. In the cup portion, a plurality of through holes allowing the inner diameter portion to be open to an outside are formed closer to the housing than a cup opening of the inner diameter portion.

2 Claims, 25 Drawing Sheets

(56) References Cited

U.S. PATENT DOCUMENTS

| | | | | |
|---|---|---|---|---|
| 11,451,894 | B2 * | 9/2022 | Lin | H04R 1/1008 |
| 11,528,551 | B2 * | 12/2022 | Lewis | H04R 1/1083 |
| 11,706,554 | B2 * | 7/2023 | Freire | H04R 1/1008 381/373 |
| 2019/0379962 | A1 * | 12/2019 | Navid | H04R 1/38 |
| 2022/0086559 | A1 * | 3/2022 | Belanger | H04R 1/2842 |
| 2022/0095030 | A1 * | 3/2022 | Pfitsch | H04R 1/2826 |
| 2022/0337931 | A1 * | 10/2022 | Liang | H04R 1/28 |

FOREIGN PATENT DOCUMENTS

| | | | |
|---|---|---|---|
| JP | 05-021591 | U | 3/1993 |
| JP | 05-219587 | A | 8/1993 |
| JP | 05-085190 | U | 11/1993 |
| JP | 06-078387 | A | 3/1994 |
| JP | 2007-060274 | A | 3/2007 |
| JP | 2017-139523 | A | 8/2017 |

* cited by examiner

HEADSET AND EAR PAD

CROSS-REFERENCE TO RELATED APPLICATIONS

This application is based on and claims the benefit of priority of Japanese Patent Application No. 2021-077917 filed on Apr. 30, 2021, the entire contents of which are incorporated herein by reference.

FIELD

The present disclosure relates to a headset and an ear pad.

BACKGROUND

There is known a headphone that includes a housing including a speaker that outputs an audio signal as a sound, and an annular ear pad that is at a position corresponding to an outer peripheral portion of the speaker, and that in a state in which an ear of a user is inserted into a recessed portion, covers the ear of the user with an outer periphery of the ear pad and has an entire wearing surface fitting a head portion around the ear, in which the headphone is worn so as to cover the entire ear of the user by the housing and the ear pad (for example, see JP-A-2017-139523). This type of headphone worn so as to cover the entire ear (so-called over-ear type headphone) has the entire wearing surface of the ear pad fitting the head portion around the ear, so that there is no pressure on an auricle, no pain is felt even when the headphone is worn for a long time, and a burden on the user is small. In addition, sound leakage between the head portion around the ear and the wearing surface is prevented, and a deterioration of sound quality is prevented.

SUMMARY

However, there is a problem that when the entire wearing surface of the ear pad is fitted to the head portion around the ear and the entire ear of the user is covered with the ear pad, a space surrounded by the ear pad becomes an enclosed space, and in long-term use, an internal space of the ear pad tends to get stuffy, and the user who is a wearer feels uncomfortable.

The present disclosure is made in view of the above-described current circumstances, and an object of the present disclosure is to provide a headset and an ear pad in which even in long-term use, an internal space of the ear pad is less likely to get stuffy and a deterioration in a wearing feeling of a user is prevented.

The present disclosure provides a headset including: a housing provided at one end portion of a headband; a boom main body attached to the housing; and an ear pad attached to the housing on a side opposite to the boom main body, wherein the ear pad includes a cup portion configured to cover an entire auricle of a wearer when the entire auricle is inserted into an inner diameter portion of the cap portion, and wherein in the cup portion, a plurality of through holes allowing the inner diameter portion to be open to an outside are formed closer to the housing than a cup opening of the inner diameter portion.

The present disclosure provides an ear pad mountable to a housing provided at one end portion of a headband, the ear pad including: a cup portion attachable to the housing and configured to cover an entire auricle of a wearer when the entire auricle is inserted into an inner diameter portion of the cup portion, wherein in the cup portion, a plurality of through holes allowing the inner diameter portion to be open to an outside are formed closer to the housing than a cup opening of the inner diameter portion.

According to the present disclosure, even in long-term use, an internal space of the ear pad is less likely to get stuffy, and a deterioration in a wearing feeling of a user can be prevented.

DETAILED DESCRIPTION

Hereinafter, embodiments in which a headset and an ear pad according to the present disclosure are specifically disclosed will be described in detail with reference to the drawings as appropriate. However, an unnecessarily detailed description may be omitted. For example, a detailed description of a well-known matter or a repeated description of substantially the same configuration may be omitted. This is to avoid unnecessary redundancy in the following description and to facilitate understanding of those skilled in the art. The accompanying drawings and the following description are provided for a thorough understanding of the present disclosure for those skilled in the art, and are not intended to limit the subject matter in the claims.

[Configuration]

Figure 1:
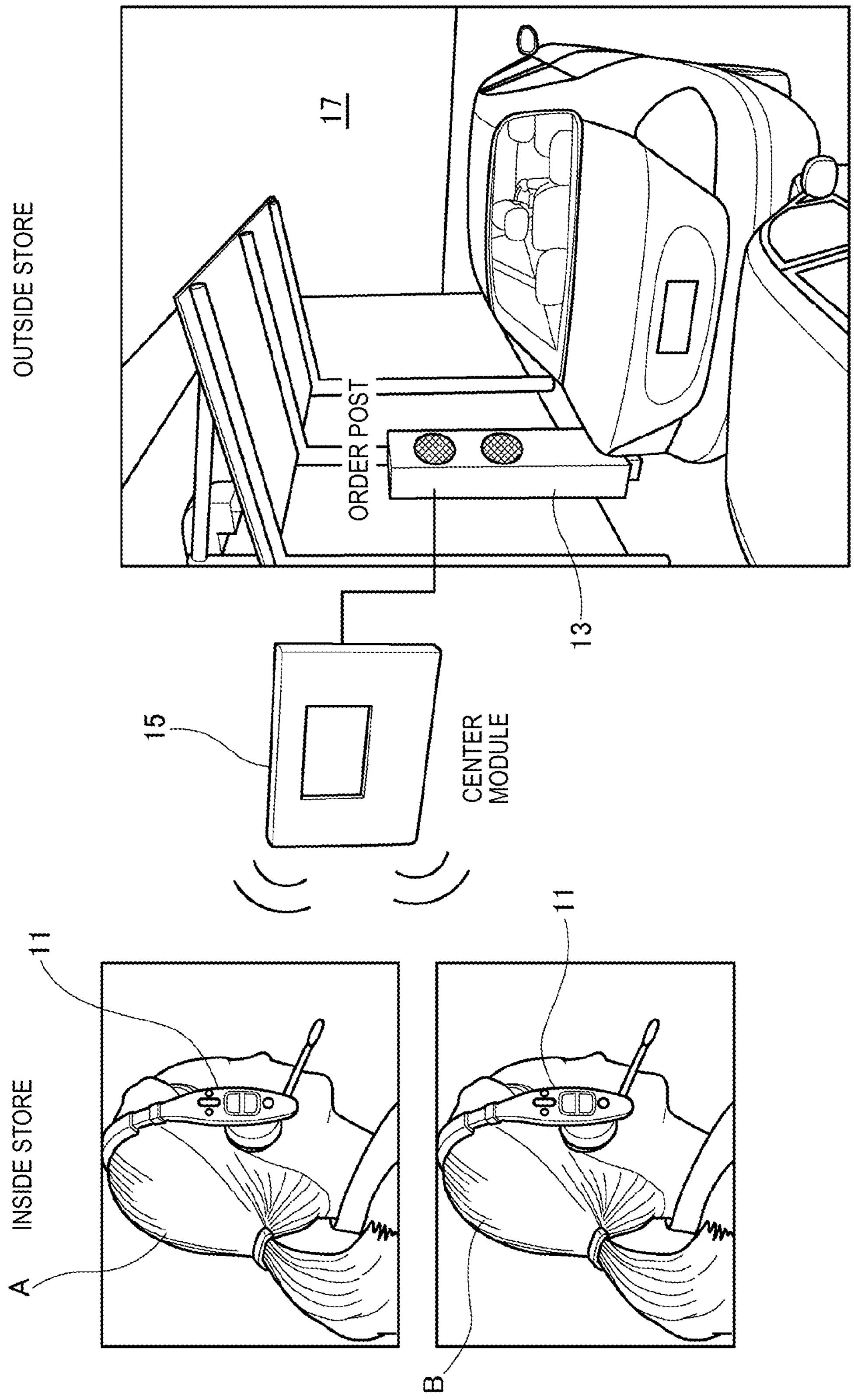
FIG. 1 is a diagram showing a system configuration example of an ordering system for a fast food store where a headset is used according to a first embodiment.

FIG. 1 is a diagram showing a system configuration example of an ordering system for a fast food store where a headset 11 is used according to a first embodiment. The ordering system for the fast food store shown in FIG. 1 includes one or more headsets 11, one or more order posts 13, and a center module 15.

The headset 11 can be widely used in various industries such as fast food industry, call center industry, and retail industry. For example, in the fast food store, in order to receive an order through the vehicle from a customer (that is, a driver of a vehicle) who comes to an existing drive-through lane 17 on the premises of the fast food store by vehicle, each of employees who are a plurality of users wears a different headset 11 to fulfill the order.

For example, in the fast food store provided with a plurality of drive-through lanes 17, the order post 13 is installed in each drive-through lane 17. The order post 13 includes a microphone that collects voice uttered by the driver of the vehicle, and a speaker (not shown) that outputs voice uttered by an employee.

The center module 15 is installed in the store.

The center module 15 mainly includes an interface unit for communication, a processor, a memory, and the like, and transmits and receives (in other words, relays) voice data of the employee in the store wearing the headset 11 and voice data of the customer outside the store by using wireless communication. As a communication method, for example, digital enhanced cordless telecommunications (DECT) of the 1.9 GHz band, which is a communication standard for digital cordless telephones, is used. The employee can select which customer in the order post 13 is to talk to. For example, when two lanes are disposed in parallel as the drive-through lane 17, the employee can switch call destinations to one of the lanes (that is, the drive-through lane 17) by double-clicking a shift button (to be described later) on the headset 11. The center module 15 can also relay calls between employees A and B, as employees in the store, for example, who are in charge of different drive-through lanes 17.

Figure 2:
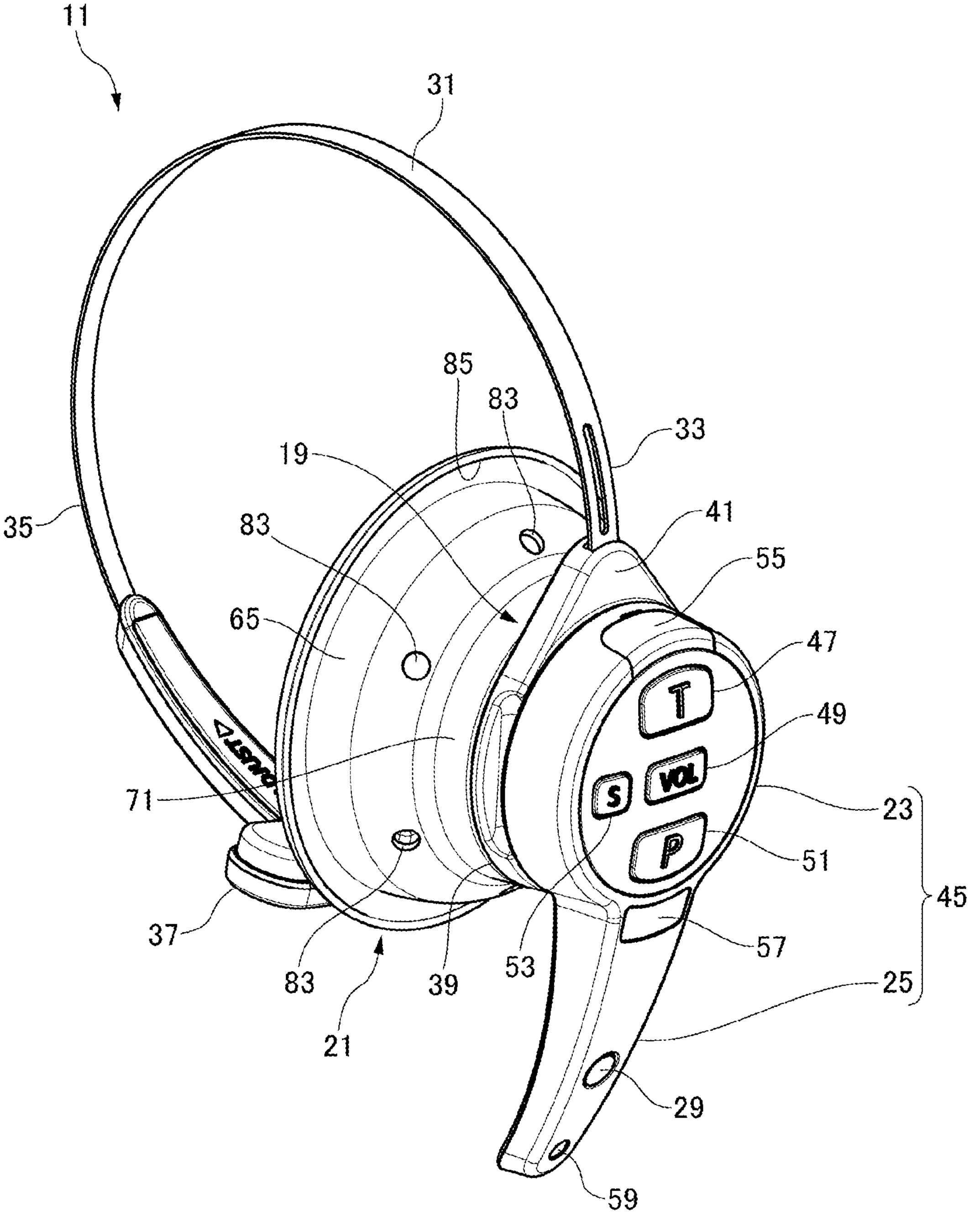
FIG. 2 is a perspective view of the headset shown in FIG. 1.

FIG. 2 is a perspective view of the headset 11 shown in FIG. 1. The headset 11 according to the first embodiment includes a housing 19, an ear pad 21, a boom main body 23, an arm portion 25, a first microphone 27 (see FIG. 3), and a second microphone 29 as main configurations.

The housing 19 is provided at one end portion 33 of a headband 31. A head pad 37 is provided at the other end portion 35 of the headband 31. The housing 19 is formed in a teardrop-shaped plate shape by a circular portion 39 and a protruding portion 41. In the headset 11, the other end portion 35 of the headband 31 is connected to the head pad 37 so as to be able to advance and retreat, and a length of the headband 31 can be adjusted according to a size of a head portion of a wearer.

The ear pad 21 is attached to a surface of the circular portion 39 facing the head pad 37. An opening 43 in which a speaker sound is emitted is formed in a central portion of the ear pad 21 (see FIG. 3). A speaker accommodated in the boom main body 23 communicates with a rear surface of the opening 43. The headset 11 is worn such that when the employee wears the headband 31 on the head portion, the head pad 37 is pressed against a side head portion on one hand, and the ear pad 21 is disposed around an ear on the other hand.

A microphone boom 45 is rotatably attached to the housing 19 on a side opposite to the ear pad 21. The microphone boom 45 is integrally formed by the boom main body 23 and the arm portion 25. The boom main body 23 is formed in a flat columnar shape. The boom main body 23 rotates about the same center as the circular portion 39 of the housing 19.

A plurality of switches are provided on a surface of the boom main body 23. These switches include, for example, a talk button 47, a volume control button 49, a page button 51, a shift button 53, and the like.

The talk button 47 is a button for a call with the customer in front of the order post 13. For example, when the talk button 47 is pressed once, a call can be made with the customer (that is, a customer who is in the vehicle) near the order post 13 of the drive-through lane 17 that is currently connected, and when the talk button 47 is pressed again, the call is ended.

When the volume control button 49 is pressed, a volume increases. When the volume reaches an upper limit, a beep sounds, and when the button is further pressed, the volume returns to a lower limit.

The page button 51 controls a call between employees. When the page button 51 is pressed once, a call can be made with the employee in charge of the drive-through lane 17 that is currently connected, and when the page button 51 is pressed again, the call is ended. An operation of the page button 51 changes depending on a setting operation for the headset 11.

Various functions of the shift button 53 can be used by pressing the shift button 53 or simultaneously pressing the shift button 53 and other buttons. For example, the shift button 53 enables switching of the drive-through lane 17 to be connected and alert notification.

A color chip 55 is detachably provided on an outer periphery of the boom main body 23. By replacing the color chip 55, it is possible to perform color coding of the headset 11, and it is possible to improve usability at the time of operation in which a plurality of different headsets 11 are actually used by a plurality of employees.

In addition, an indicator lamp unit 57 and a lane indicator lamp 59 are provided in the arm portion 25. A power indicator lamp and a setting indicator lamp (not shown) are disposed in the indicator lamp unit 57. The lane indicator lamp 59 represents the drive-through lane 17 to which the headset 11 is connected according to lighting color.

The arm portion 25 is provided on the boom main body 23, protrudes toward a side opposite to the one end portion 33 of the headband 31, and sandwiches the housing 19 with the one end portion 33. The arm portion 25 is formed in a curved pyramid shape so that a protruding tip end faces a mouth along a cheek when worn by the employee. An inside of the arm portion 25 is an electrical component accommodating portion (not shown) that communicates with the boom main body 23.

Figure 3:
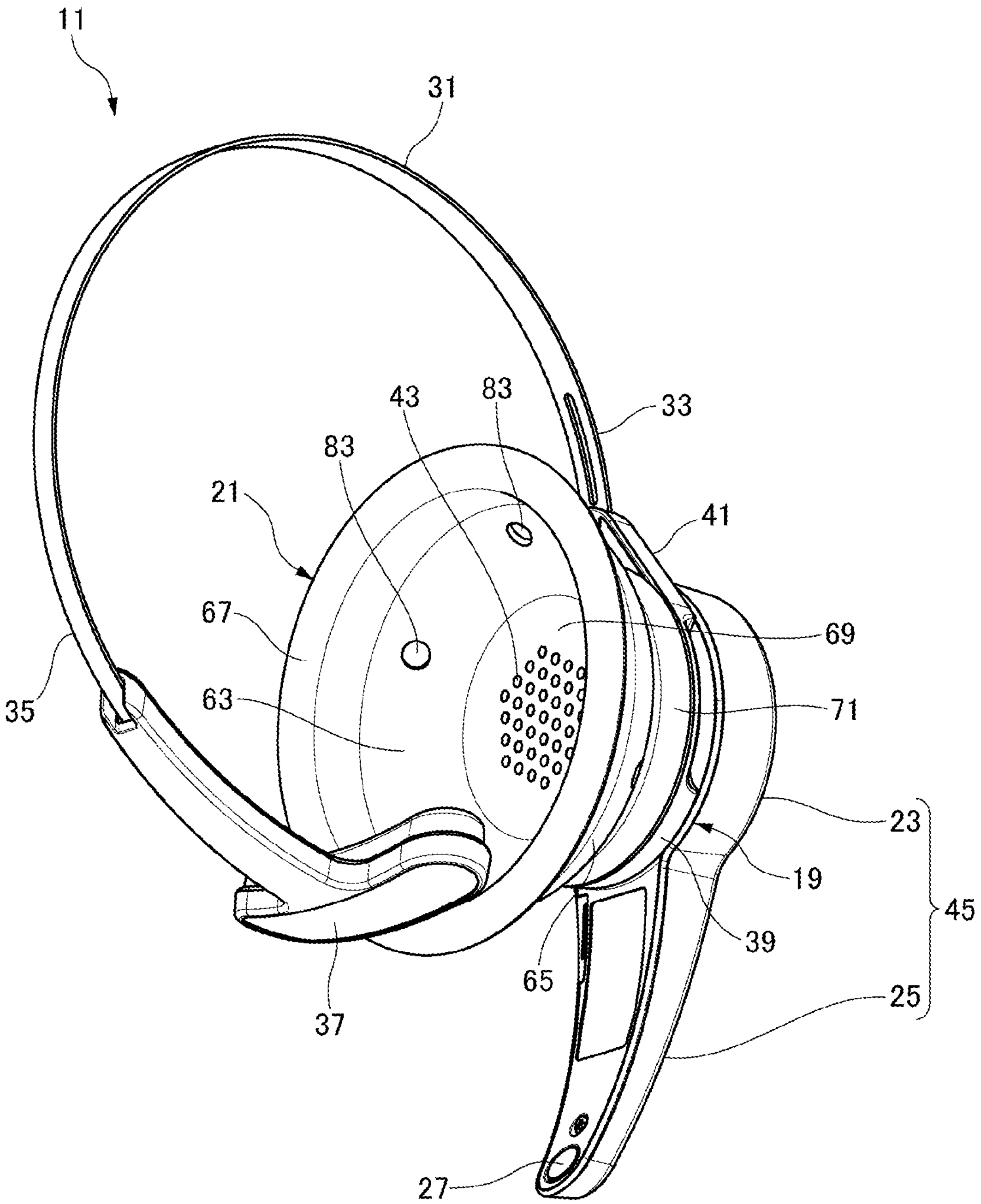
FIG. 3 is a perspective view of the headset of FIG. 2 as viewed from a cup portion side.

FIG. 3 is a perspective view of the headset 11 of FIG. 2 as viewed from a cup portion side. The first microphone 27 is provided at the protruding tip end of the arm portion 25. The first microphone 27 is disposed on an arm inner surface facing the mouth of the employee at the protruding tip end of the arm portion 25.

For the first microphone 27 and the second microphone 29, for example, an omnidirectional microphone as a micro electro mechanical systems (MEMS) microphone is used. In the headset 11, a plurality of omnidirectional microphones (for example, the first microphone 27 and the second microphone 29) are used to facilitate formation of directivity.

The boom main body 23 is provided with a battery accommodating portion (not shown) that accommodates a battery. When the battery is inserted into the battery accommodating portion, the battery is held by a battery lock (not shown). The battery can be removed by pushing the battery lock.

The housing 19 is locked by rotatably inserting a shaft (not shown) of the boom main body 23 into the circular portion 39. A speaker accommodating tube portion (not shown) that accommodates the speaker (not shown) is formed in the shaft. The speaker accommodating tube portion penetrates the circular portion 39 of the housing 19 and faces the opening 43 of the ear pad 21. A front end opening of the speaker accommodating tube portion faces the opening 43 of the ear pad 21, so that voice from the speaker can be output from the ear pad 21. In the headset 11, all electrical components are accommodated in the boom main body 23.

In the headset 11 according to the first embodiment, on a substantially straight line passing through the mouth of the employee (an example of the wearer, and the similar applies below) and the first microphone 27, the second microphone 29 is disposed on a side opposite to the mouth of the employee sandwiching the first microphone 27 with the mouth of the employee. That is, in the headset 11, the first microphone 27 and the second microphone 29 are disposed on the substantially straight line in an order proximity to the mouth. The headset 11 performs voice detection of the employee using the first microphone 27 and the second microphone 29 at different distances apart from the mouth. In addition to the voice detection, the headset 11 can control directivity with respect to the mouth by the first microphone 27 and the second microphone 29. The headset 11 can easily prevent continuous ambient noise as compared with a configuration of a single microphone. Therefore, the headset 11 has both improved sound collecting performance and weight reduction so that the voice can be heard clearly even in a noisy environment, for example.

Figure 4:
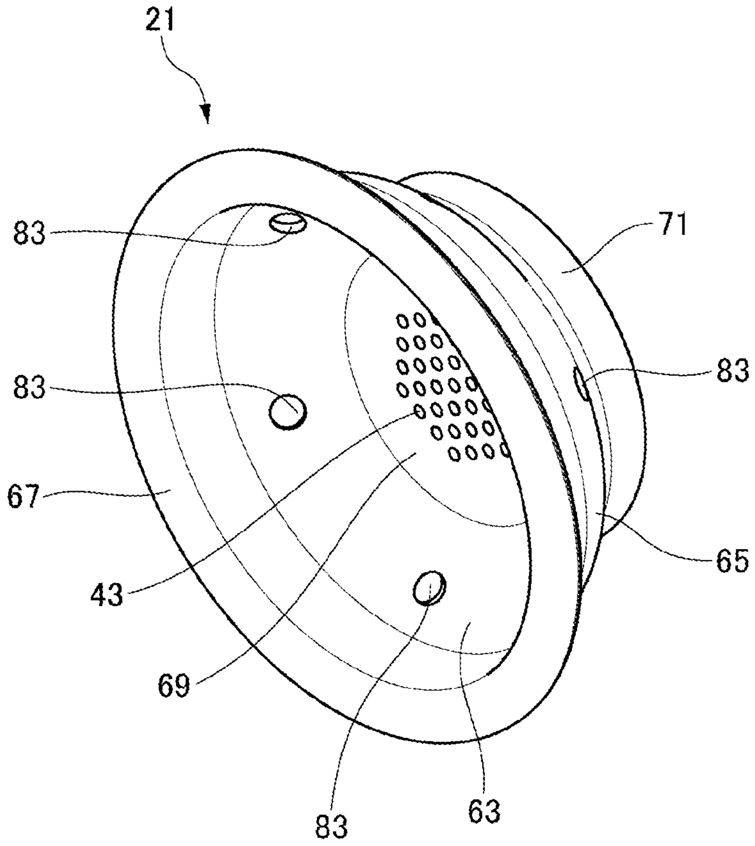
FIG. 4 is a perspective view of an ear pad as viewed from the cup portion side.

FIG. 4 is a perspective view of the ear pad 21 as viewed from the cup portion side. The ear pad 21 according to the first embodiment includes a cup portion 65 configured to cover an entire auricle 61 (see FIG. 5) of the employee (an example of the wearer, and the similar applies below) when the entire auricle 61 is inserted into an inner diameter portion 63. The inner diameter portion 63 has a bottom portion 69 on a side opposite to a cup opening 67. The cup portion 65 has a bottomed cylindrical shape whose diameter is gradually increased from the bottom portion 69 toward the cup opening 67. That is, the cup portion 65 has a bowl shape or a mortar shape. In the ear pad 21, a cylindrical housing mounting portion 71 is continuously formed on a side opposite to the cup opening 67 sandwiching the bottom portion 69 with the cup opening 67. In the ear pad 21, the cup portion 65, the bottom portion 69, and the housing mounting portion 71 are integrally molded. Examples of a molding material for the ear pad 21 include silicone rubber, urethane rubber, and natural rubber. As these materials, a soft material having a hardness of about 60° is preferably used.

Figure 5:
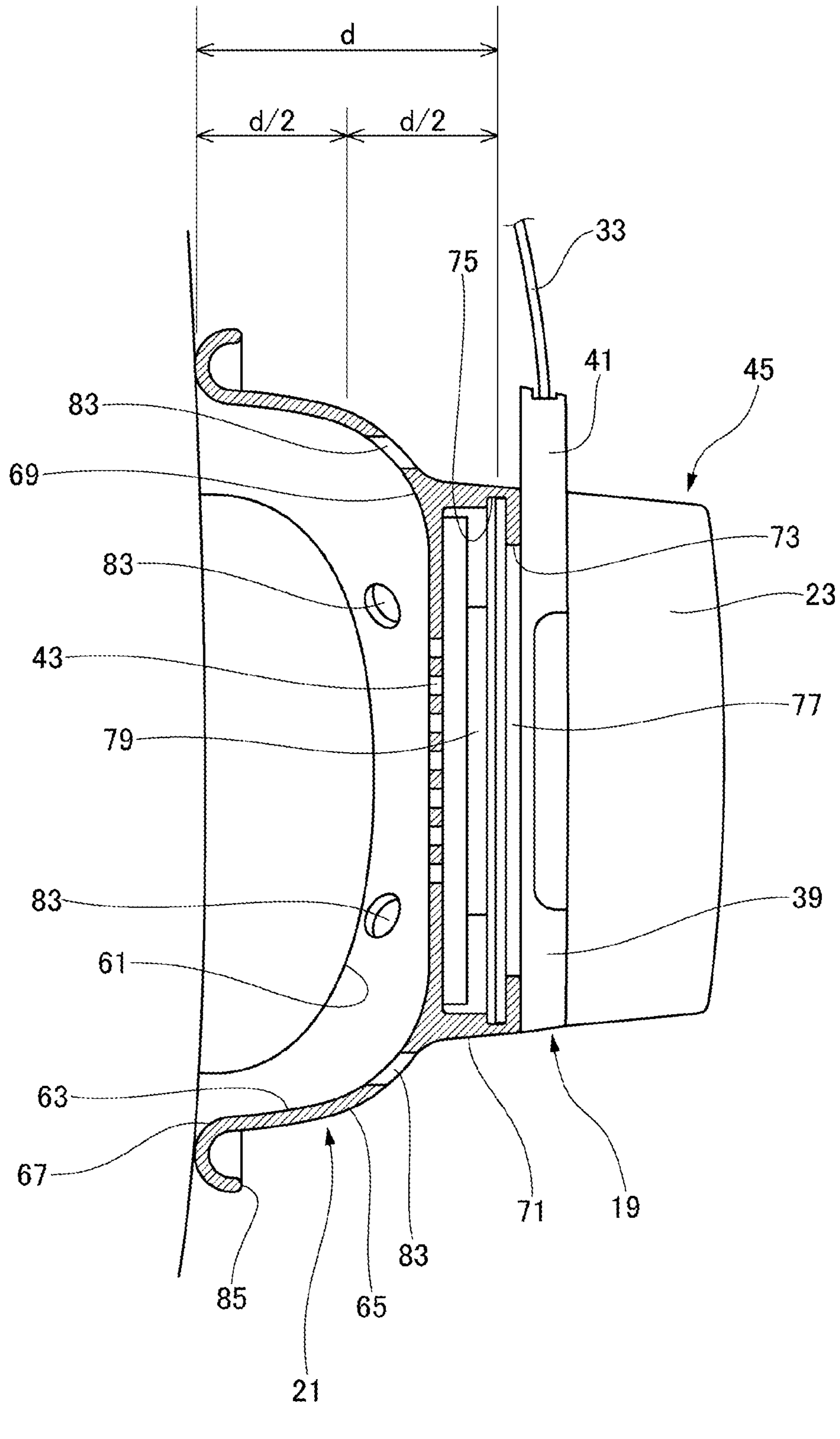
FIG. 5 is a partial cutaway cross-sectional view of the ear pad of the headset disposed on a side head portion with an auricle inserted into the ear pad.

FIG. 5 is a partial cutaway cross-sectional view of the ear pad 21 of the headset 11 disposed on the side head portion with the auricle 61 inserted into the ear pad 21. The housing mounting portion 71 has a mounting opening 73 on a side opposite to the bottom portion 69. That is, the bottom portion 69 is a partition wall between the inner diameter portion 63 and the housing mounting portion 71. The housing mounting portion 71 is formed with a peripheral groove 75 on an inner circumferential surface on a rear side (bottom side) relative to the mounting opening 73. A fixed flange portion 77 of the housing 19 to be inserted from the mounting opening 73 whose diameter is expanded by elastic deformation can be fitted into the peripheral groove 75. A tubular front portion 79 of the above speaker accommodating tube portion protrudes from a tip end surface of the fixed flange portion 77. The tubular front portion 79 faces the opening 43 on the bottom portion 69.

Figure 6:
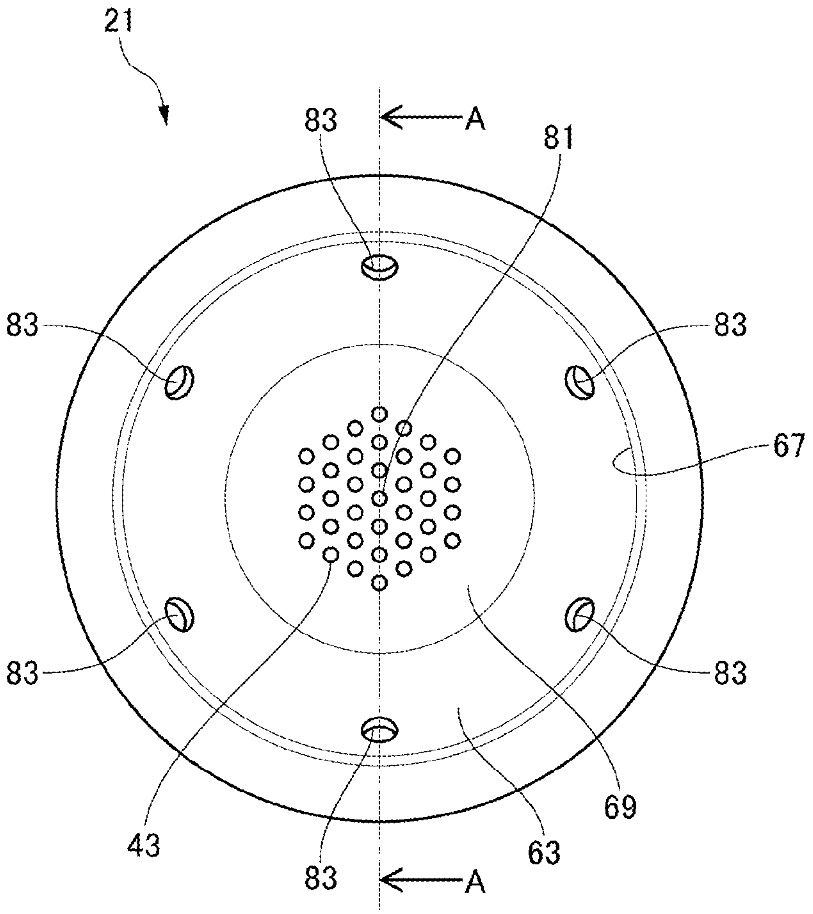
FIG. 6 is a front view of the ear pad as viewed from an opening side.

FIG. 6 is a front view of the ear pad 21 as viewed from an opening side. The bottom portion 69 is formed in a disk shape. The bottom portion 69 is provided with the plurality of openings 43 for outputting voice from the speaker to the inner diameter portion 63 in a concentrated manner in the central portion. For example, 37 openings 43 are arranged in a hexagonal shape around a bottom center 81. Accordingly, the ear pad 21 can output the speaker sound from the tubular front portion 79 through the openings 43 to the inner diameter portion 63.

The cup portion 65 is provided with a plurality of through holes 83 for opening the inner diameter portion 63 to the outside. The through holes 83 are provided at equal intervals in a circumferential direction centered on the bottom center 81 of the cup portion 65 so as to surround the opening 43. The through hole 83 is formed, for example, in a perfect circle. For example, six through holes 83 are disposed. A shape and the number of the through holes 83 are not limited thereto.

Figure 7:
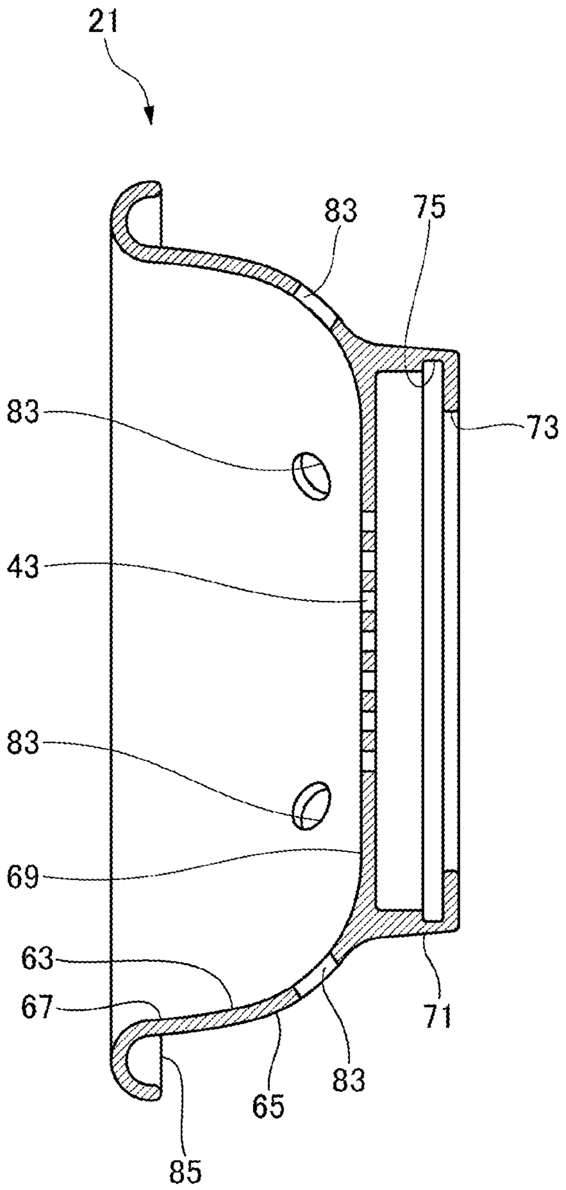
FIG. 7 is a cross-sectional view taken along a line A-A of FIG. 6.

FIG. 7 is a cross-sectional view taken along a line A-A of FIG. 6. The plurality of through holes 83 allowing the inner diameter portion 63 to be open to the outside are formed closer to the housing 19 than the cup opening 67. The through hole 83 is provided on a housing side with respect to an intermediate position (d/2) of a distance d (see FIG. 5) between the housing 19 and the cup opening 67. That is, the through hole 83 is closer to the bottom portion 69 than the cup opening 67 of the inner diameter portion 63.

The ear pad 21 has a curved portion 85 around the cup opening 67. The curved portion 85 is continuous with the cup opening 67 and is curved outward with a curved surface having a C-shaped cross section. In the cup portion 65, the cup opening 67 in which the auricle 61 is inserted into the inner diameter portion 63 contacts a skin of the side head portion on the curved surface. The curved portion 85 shows an example of being curved in the C-shaped cross section, but the curved portion 85 may be wound in a spiral shape (that is, curled).

[Modifications]

Next, the modifications of the first embodiment will be described.

(First Modification)

Figure 8:
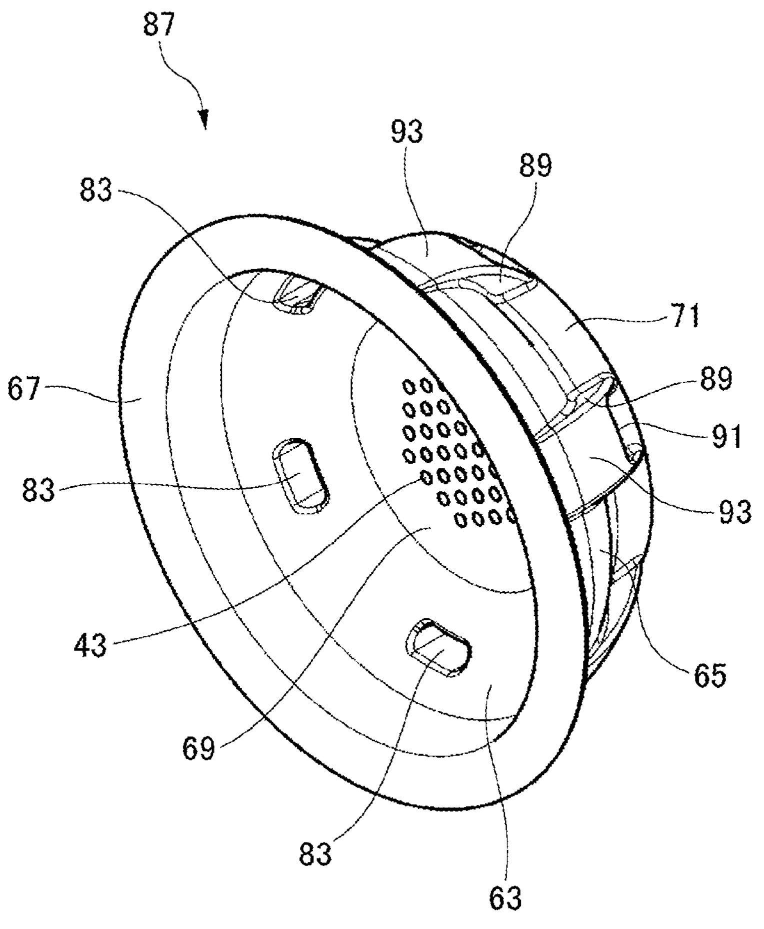
FIG. 8 is a perspective view of an ear pad as viewed from the cup portion side according to a first modification.

FIG. 8 is a perspective view of an ear pad 87 as viewed from the cup portion side according to the first modification. The ear pad 87 according to the first modification includes the cup portion 65 configured to cover the entire auricle 61 (see FIG. 9) of the employee (an example of the wearer) when the entire auricle 61 is inserted into the inner diameter portion 63. The inner diameter portion 63 has the bottom portion 69 on the side opposite to the cup opening 67 of the inner diameter portion 63. The cup portion 65 has the bottomed cylindrical shape whose diameter is gradually increased from the bottom portion 69 toward the cup opening 67. That is, the cup portion 65 has a bowl shape or a mortar shape. In the ear pad 87, the cylindrical housing mounting portion 71 is continuously formed on the side opposite to the cup opening 67 sandwiching the bottom portion 69 with the cup opening 67. In the ear pad 87, the cup portion 65, the bottom portion 69, and the housing mounting portion 71 are integrally molded. Examples of a molding material for the ear pad 87 include silicone rubber, urethane rubber, and natural rubber. As these materials, the soft material having the hardness of about 60° is preferably used.

Figure 9:
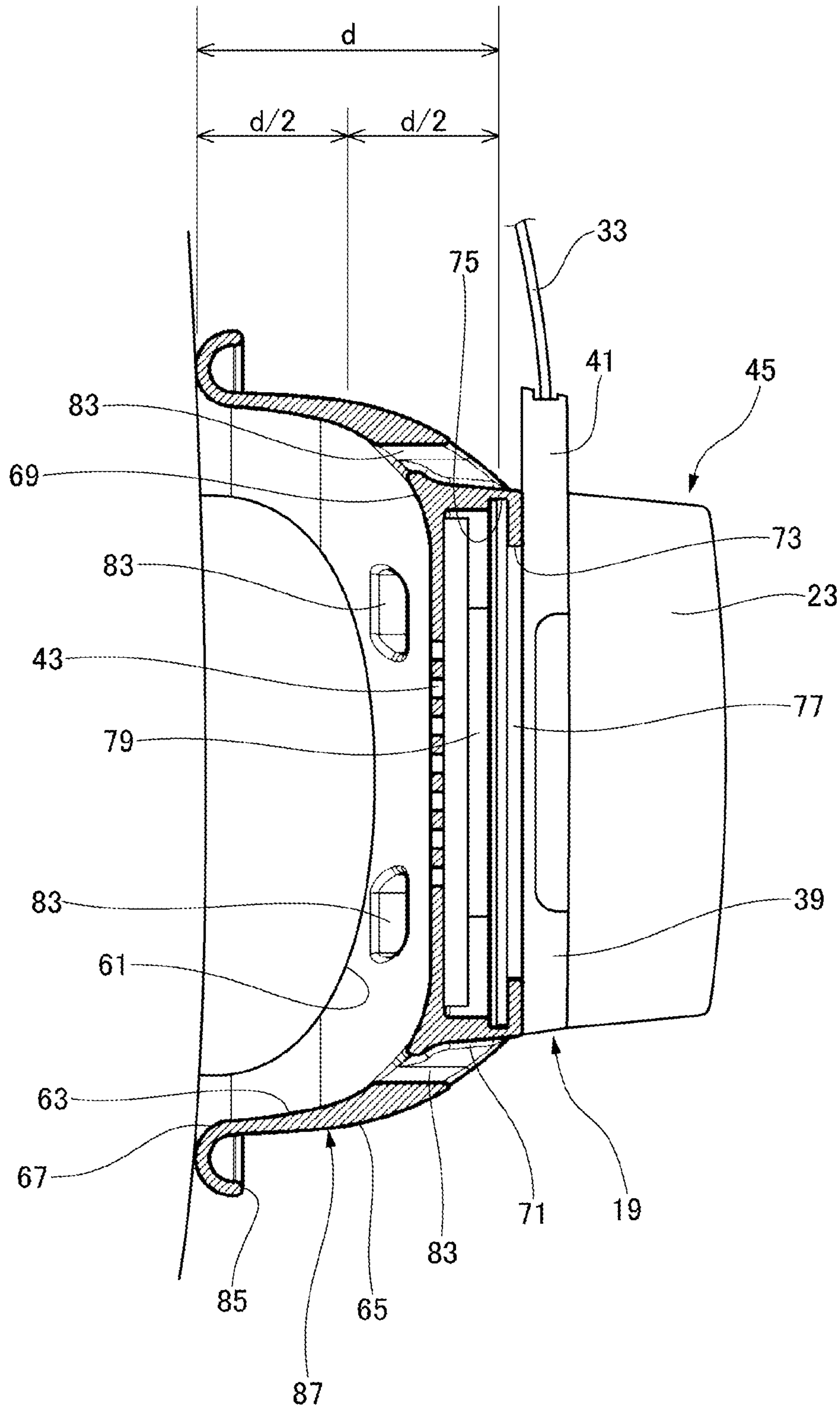
FIG. 9 is a partial cutaway cross-sectional view of the ear pad of the headset disposed on the side head portion with the auricle inserted into the ear pad according to the first modification.

FIG. 9 is a partial cutaway cross-sectional view of the ear pad 87 of the headset 11 disposed on the side head portion with the auricle 61 inserted into the ear pad 87 according to the first modification. The housing mounting portion 71 has the mounting opening 73 on the side opposite to the bottom portion 69. That is, the bottom portion 69 is the partition wall between the inner diameter portion 63 and the housing mounting portion 71. The housing mounting portion 71 is formed with the peripheral groove 75 on the inner circumferential surface on the rear side (bottom side) relative to the mounting opening 73. The fixed flange portion 77 of the housing 19 to be inserted from the mounting opening 73 whose diameter is expanded by the elastic deformation can be fitted into the peripheral groove 75. The tubular front portion 79 protrudes from the tip end surface of the fixed flange portion 77. The tubular front portion 79 faces the opening 43 on the bottom portion 69.

A thickness of the cup portion 65 gradually increases from the cup opening 67 toward the housing mounting portion 71. Accordingly, the cup portion 65 is less likely to be crushed. The through hole 83 is open toward a rear side (housing side) in a thick portion. In the ear pad 87 according to the first modification, since the opening 43 (speaker hole) and the through hole 83 are in the same direction, the speaker sound and an external sound are less likely to cause a sense of discomfort.

Figure 10:
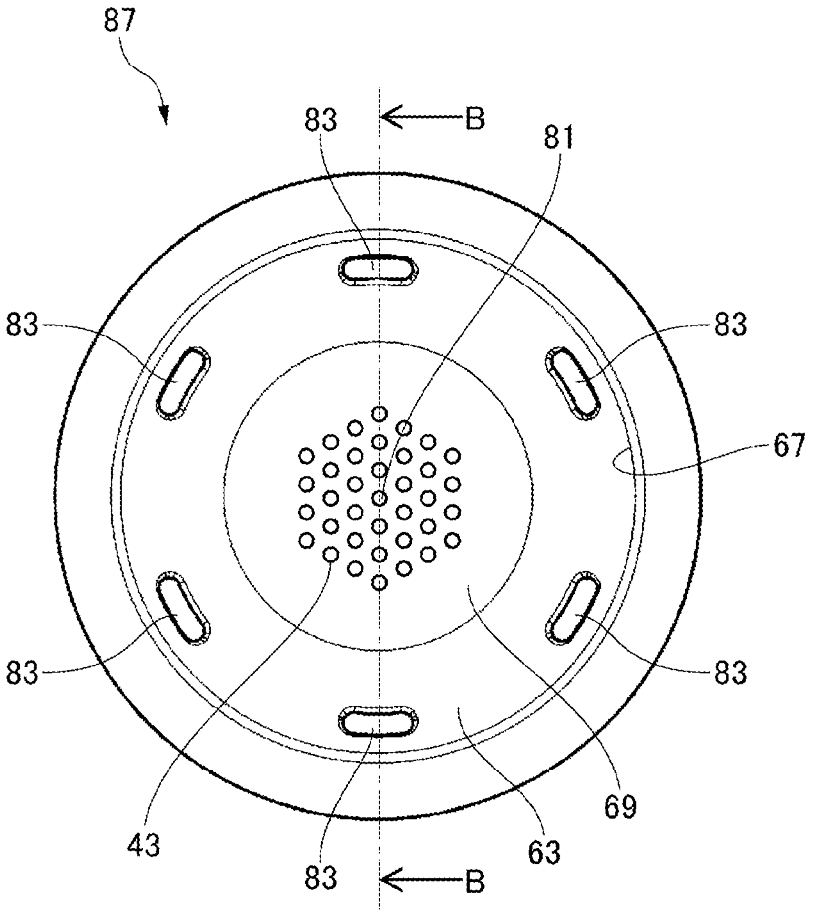
FIG. 10 is a front view of the ear pad as viewed from the opening side according to the first modification.

FIG. 10 is a front view of the ear pad 87 as viewed from the opening side according to the first modification. The bottom portion 69 is formed in a disk shape. The bottom portion 69 is provided with the plurality of openings 43 for outputting voice from the speaker to the inner diameter portion 63 in a concentrated manner in the central portion. For example, 37 openings 43 are arranged in the hexagonal shape around the bottom center 81. Accordingly, the ear pad 21 can output the speaker sound from the tubular front portion 79 through the openings 43 to the inner diameter portion 63.

A plurality of through holes 83 of the ear pad 87 according to the first modification are provided at equal intervals in the circumferential direction centered on the bottom center 81 of the cup portion 65 so as to surround the opening 43. The through hole 83 of the ear pad 87 according to the first modification is formed, for example, in an elliptical shape that is long in the circumferential direction of the inner diameter portion 63. For example, six through holes 83 of the ear pad 87 according to the first modification are disposed. The shape and the number of the through holes 83 are not limited thereto.

Figure 11:
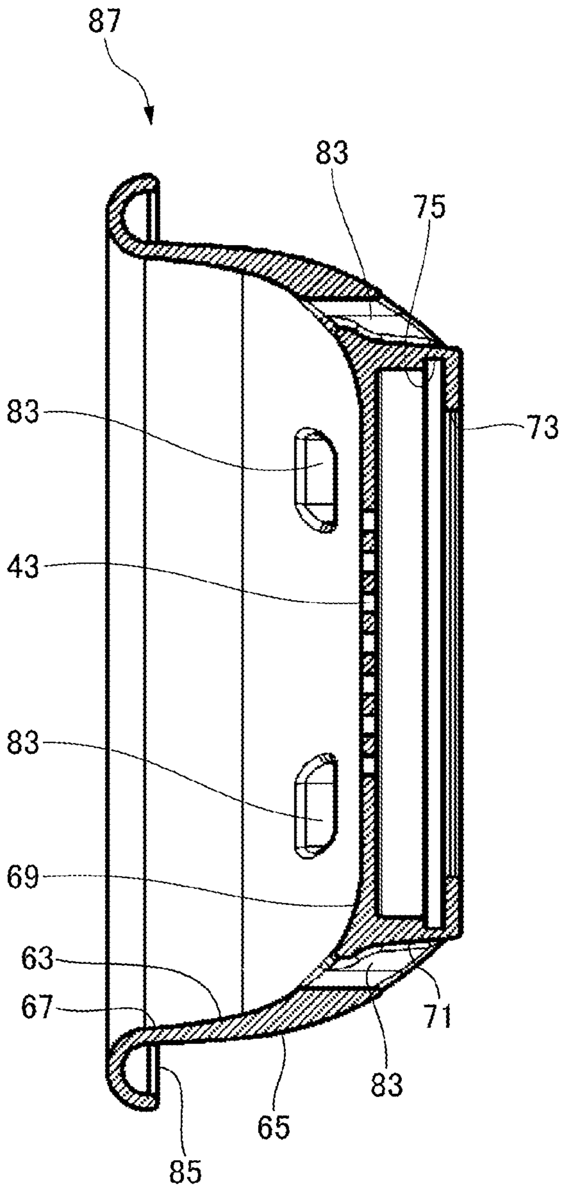
FIG. 11 is a cross-sectional view taken along a line B-B of FIG. 10.

FIG. 11 is a cross-sectional view taken along a line B-B of FIG. 10. The plurality of through holes 83 allowing the inner diameter portion 63 to be open to the outside are formed closer to the housing 19 than the cup opening 67. The through hole 83 of the ear pad 87 according to the first modification is provided on the housing side with respect to the intermediate position (d/2) of the distance d (see FIG. 9) between the housing 19 and the cup opening 67. That is, the through hole 83 of the ear pad 87 according to the first modification is closer to the bottom portion 69 than the cup opening 67 of the inner diameter portion 63.

The ear pad 87 has the curved portion 85 around the cup opening 67. The curved portion 85 is continuous with the cup opening 67 and is curved outward with the curved surface having the C-shaped cross section. In the cup portion 65, the cup opening 67 in which the auricle 61 is inserted into the inner diameter portion 63 contacts the skin of the side head portion on the curved surface. The curved portion 85 shows an example of being curved in the C-shaped cross section, but the curved portion 85 may be wound in a spiral shape (that is, curled).

Figure 12:
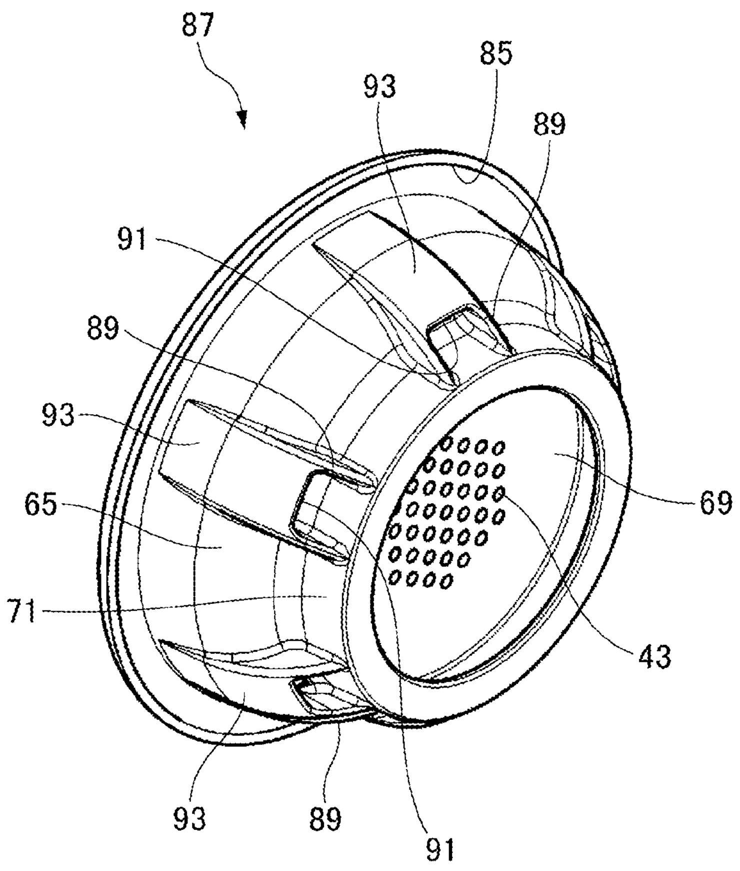
FIG. 12 is a perspective view of the ear pad as viewed obliquely from an upper rear position according to the first modification.

FIG. 12 is a perspective view of the ear pad 87 as viewed obliquely from an upper rear position according to the first modification. In the ear pad 87 according to the first modification, a plurality of ribs 89 are provided on an outer circumferential surface of the cup portion 65. The rib 89 protrudes from the outer circumferential surface so as to surround the through hole 83. In the rib 89, a pair of parallel standing walls protruding from the outer circumferential surface of the cup portion 65 sandwiching the through hole 83 are formed from the housing mounting portion 71 toward a vicinity of the curved portion 85. Distal ends of the pair of ribs 89 are connected to each other by a bridge portion 93, except that a vicinity of the housing mounting portion 71 is an opening portion 91. That is, the rib 89 allows the through hole 83 to be open to the outside from the opening portion 91 toward the rear side (housing side).

Figure 13:
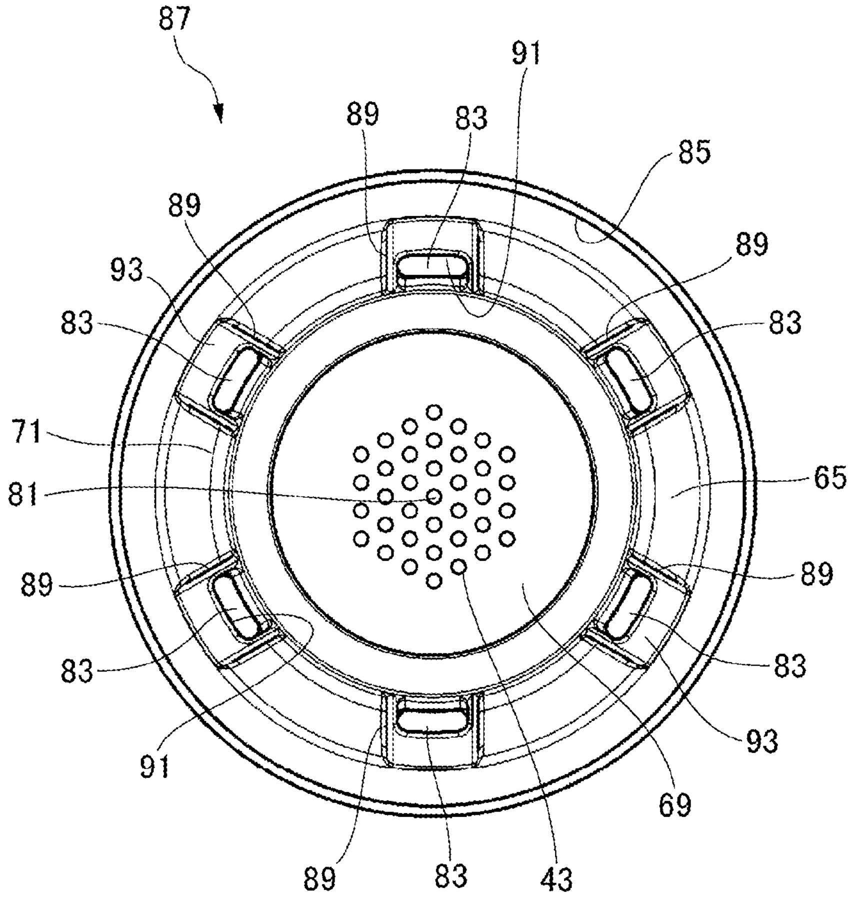
FIG. 13 is a rear view of the ear pad according to the first modification.

FIG. 13 is a rear view of the ear pad 87 according to the first modification. The ribs 89 are radially formed around the bottom center 81 of the cup portion 65. For example, six ribs 89 are provided in the circumferential direction, but the number of the ribs 89 is not limited thereto. The number of the ribs 89 may be, for example, three, five, four, seven, eight, or the like as long as the number of ribs 89 corresponds to the number of the through holes 83.

(Second Modification)

Figure 14:
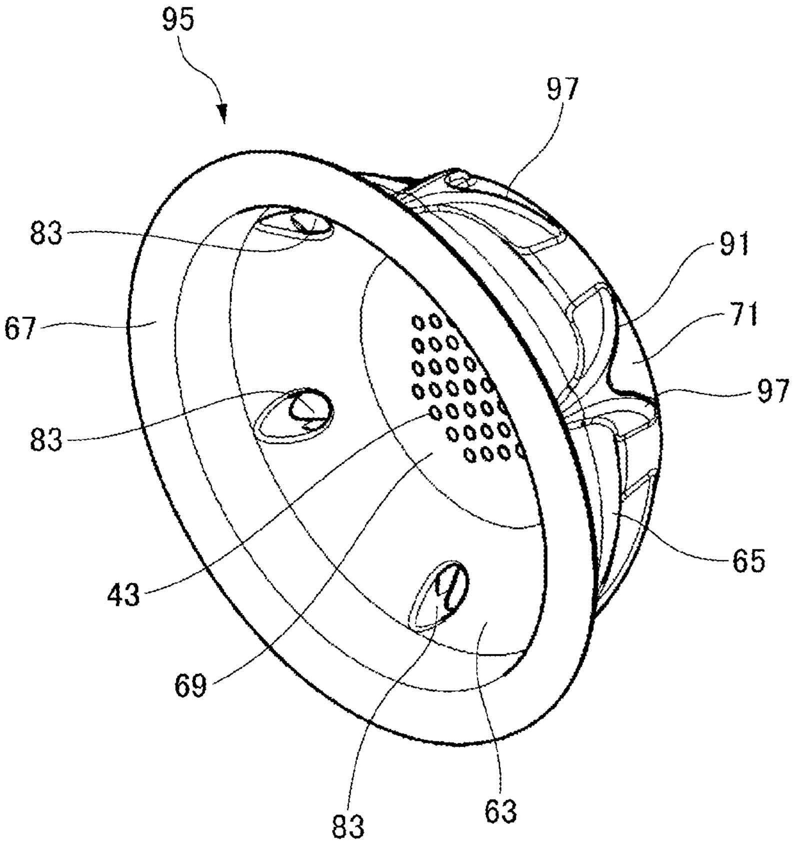
FIG. 14 is a perspective view of an ear pad as viewed from the cup portion side according to a second modification.

FIG. 14 is a perspective view of an ear pad 95 as viewed from the cup portion side according to the second modification. The ear pad 95 according to the second modification includes the cup portion 65 configured to cover the entire auricle 61 (see FIG. 15) of the employee (an example of the wearer) when the entire auricle 61 is inserted into the inner diameter portion 63. The inner diameter portion 63 has the bottom portion 69 on the side opposite to the cup opening 67 of the inner diameter portion 63. The cup portion 65 has the bottomed cylindrical shape whose diameter is gradually increased from the bottom portion 69 toward the cup opening 67. That is, the cup portion 65 has a bowl shape or a mortar shape. In the ear pad 95, the cylindrical housing mounting portion 71 is continuously formed on the side opposite to the cup opening 67 sandwiching the bottom portion 69 with the cup opening 67. In the ear pad 95, the cup portion 65, the bottom portion 69, and the housing mounting portion 71 are integrally molded. Examples of a molding material for the ear pad 95 include silicone rubber, urethane rubber, and natural rubber. As these materials, the soft material having the hardness of about 60° is preferably used.

Figure 15:
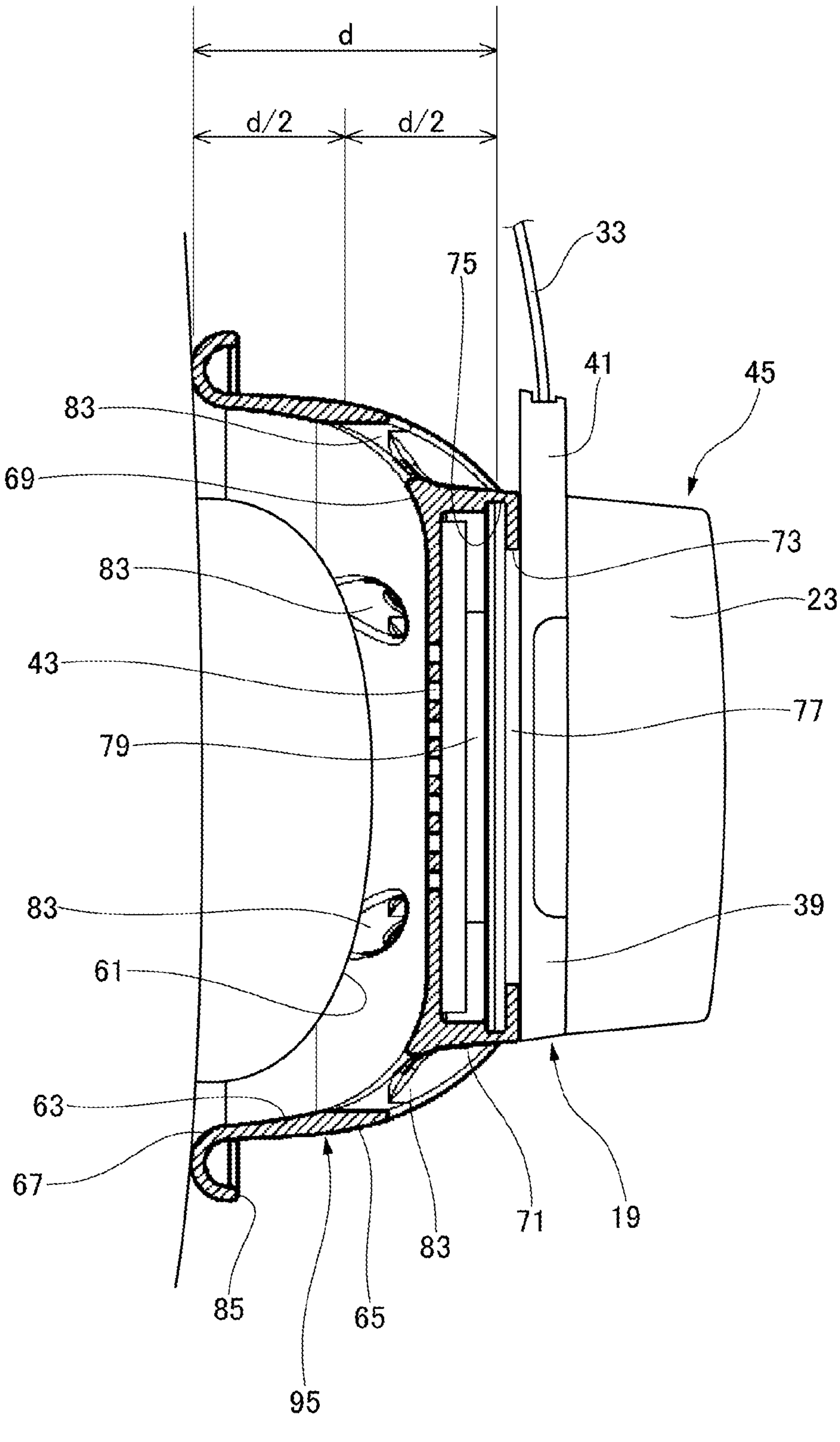
FIG. 15 is a partial cutaway cross-sectional view of the ear pad of the headset disposed on the side head portion with the auricle inserted into the ear pad according to the second modification.

FIG. 15 is a partial cutaway cross-sectional view of the ear pad 95 of the headset 11 disposed on the side head portion with the auricle 61 inserted into the ear pad 95 according to the second modification. The housing mounting portion 71 has the mounting opening 73 on the side opposite to the bottom portion 69. That is, the bottom portion 69 is the partition wall between the inner diameter portion 63 and the housing mounting portion 71. The housing mounting portion 71 is formed with the peripheral groove 75 on the inner circumferential surface on the rear side (bottom side) relative to the mounting opening 73. The fixed flange portion 77 of the housing 19 to be inserted from the mounting opening 73 whose diameter is expanded by the elastic deformation can be fitted into the peripheral groove 75. The tubular front portion 79 protrudes from the tip end surface of the fixed flange portion 77. The tubular front portion 79 faces the opening 43 on the bottom portion 69.

The thickness of the cup portion 65 gradually increases from the cup opening 67 toward the housing mounting portion 71. Accordingly, the cup portion 65 is less likely to be crushed. The through hole 83 is open toward the rear side (housing side) in the thick portion. In the ear pad 95 according to the second modification, since the opening 43 (speaker hole) and the through hole 83 are in the same direction, the speaker sound and the external sound are less likely to cause the sense of discomfort.

Figure 16:
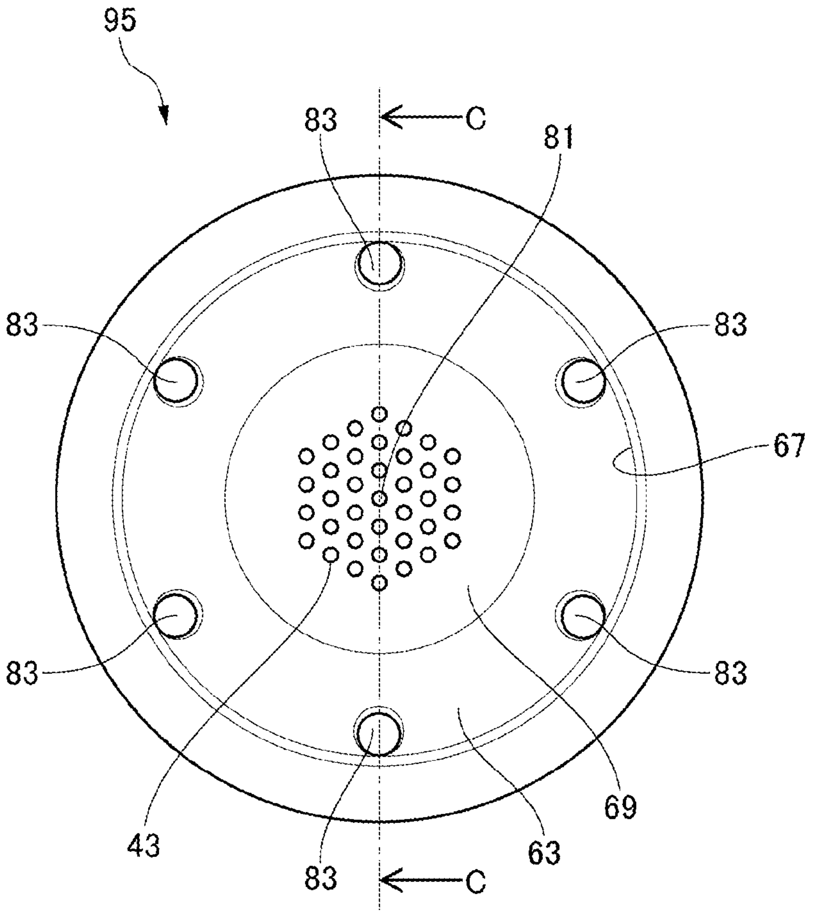
FIG. 16 is a front view of the ear pad as viewed from the opening side according to the second modification.

FIG. 16 is a front view of the ear pad 95 as viewed from the opening side according to the second modification. The bottom portion 69 is formed in a disk shape. The bottom portion 69 is provided with the plurality of openings 43 for outputting voice from the speaker to the inner diameter portion 63 in a concentrated manner in the central portion. For example, 37 openings 43 are arranged in the hexagonal shape around the bottom center 81. Accordingly, the ear pad 21 can output the speaker sound from the tubular front portion 79 through the openings 43 to the inner diameter portion 63.

A plurality of through holes 83 of the ear pad 95 according to the second modification are provided at equal intervals in the circumferential direction centered on the bottom center 81 of the cup portion 65 so as to surround the opening 43. The through hole 83 of the ear pad 95 according to the second modification is formed in an elongated circle that is long outward in a radial direction of the cup portion 65. For example, six through holes 83 of the ear pad 95 according to the second modification are disposed. The shape and the number of the through holes 83 are not limited thereto.

Figure 17:
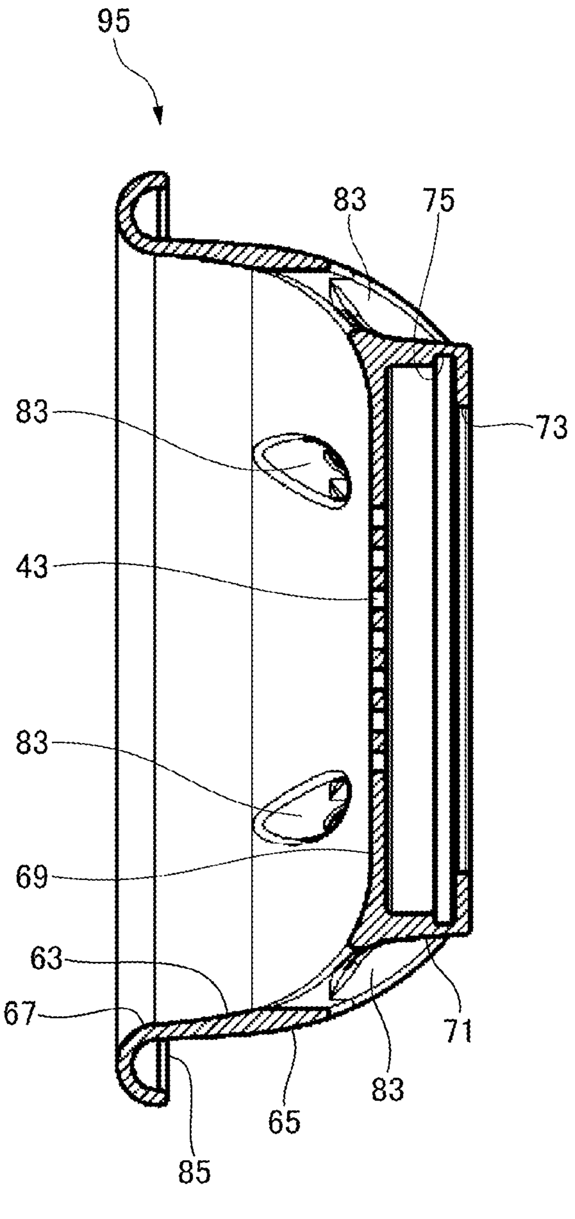
FIG. 17 is a cross-sectional view taken along a line C-C of FIG. 16.

FIG. 17 is a cross-sectional view taken along a line C-C of FIG. 16. The plurality of through holes 83 allowing the inner diameter portion 63 to be open to the outside are formed closer to the housing 19 than the cup opening 67. The through hole 83 of the ear pad 95 according to the second modification is provided on the housing side with respect to the intermediate position (d/2) of the distance d (see FIG. 15) between the housing 19 and the cup opening 67. That is, the through hole 83 of the ear pad 95 according to the second modification is closer to the bottom portion 69 than the cup opening 67 of the inner diameter portion 63.

The ear pad 95 has the curved portion 85 around the cup opening 67. The curved portion 85 is continuous with the cup opening 67 and is curved outward with the curved surface having the C-shaped cross section. In the cup portion 65, the cup opening 67 in which the auricle 61 is inserted into the inner diameter portion 63 contacts the skin of the side head portion on the curved surface. The curved portion 85 shows an example of being curved in the C-shaped cross section, but the curved portion 85 may be wound in a spiral shape (that is, curled).

Figure 18:
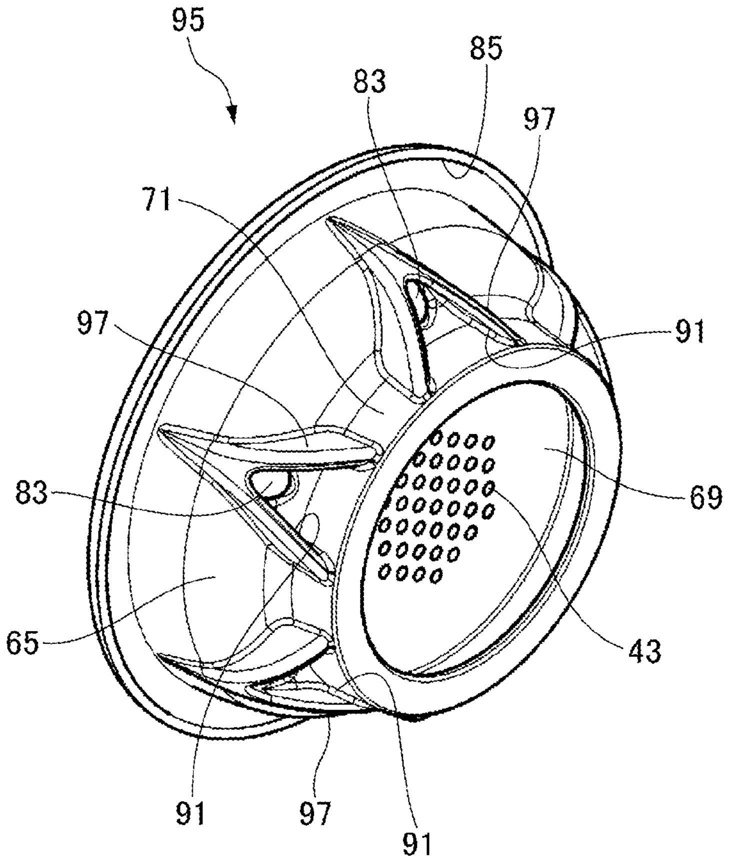
FIG. 18 is a perspective view of the ear pad as viewed obliquely from the upper rear position according to the second modification.

FIG. 18 is a perspective view of the ear pad 95 as viewed obliquely from the upper rear position according to the second modification. In the ear pad 95 according to the second modification, a plurality of ribs 97 are provided on the outer circumferential surface of the cup portion 65. The rib 97 protrudes from the outer circumferential surface so as to surround the through hole 83. In the rib 97, a pair of parallel standing walls protruding from the outer circumferential surface of the cup portion 65 sandwiching the through hole 83 are formed gradually approaching from the housing mounting portion 71 toward a vicinity of the curved portion 85. In other words, the pair of ribs 97 are formed as two sides of a triangle with the housing mounting portion 71 as a base. The pair of ribs 97 are largely spaced apart from each other in the vicinity of the housing mounting portion 71 to allow the through hole 83 to be open. That is, the rib 97 allows the through hole 83 to be open to the outside from the opening portion 91 toward the rear side (housing side).

Figure 19:
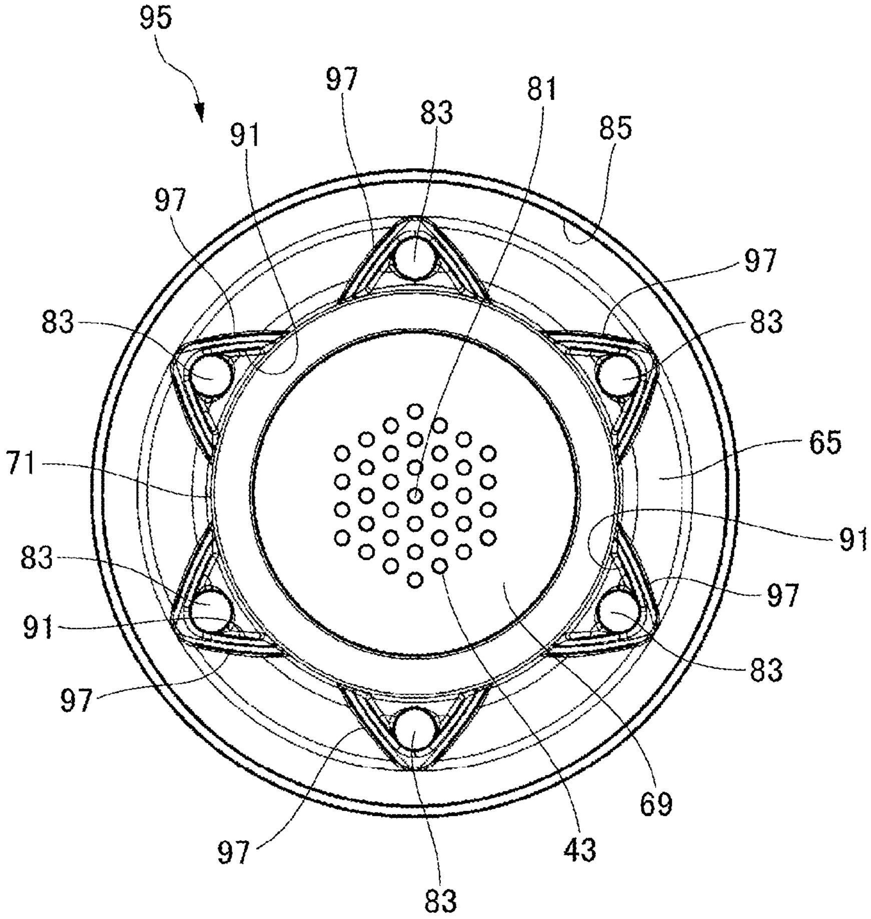
FIG. 19 is a rear view of the ear pad according to the second modification.

FIG. 19 is a rear view of the ear pad 95 according to the second modification. The ribs 97 are radially formed around the bottom center 81 of the cup portion 65. For example, six ribs 97 are provided in the circumferential direction, but the number of the ribs 97 is not limited thereto. The number of the ribs 97 may be, for example, three, five, four, seven, eight, or the like as long as the number of ribs 97 corresponds to the number of the through holes 83.

(Third Modification)

Figure 20:
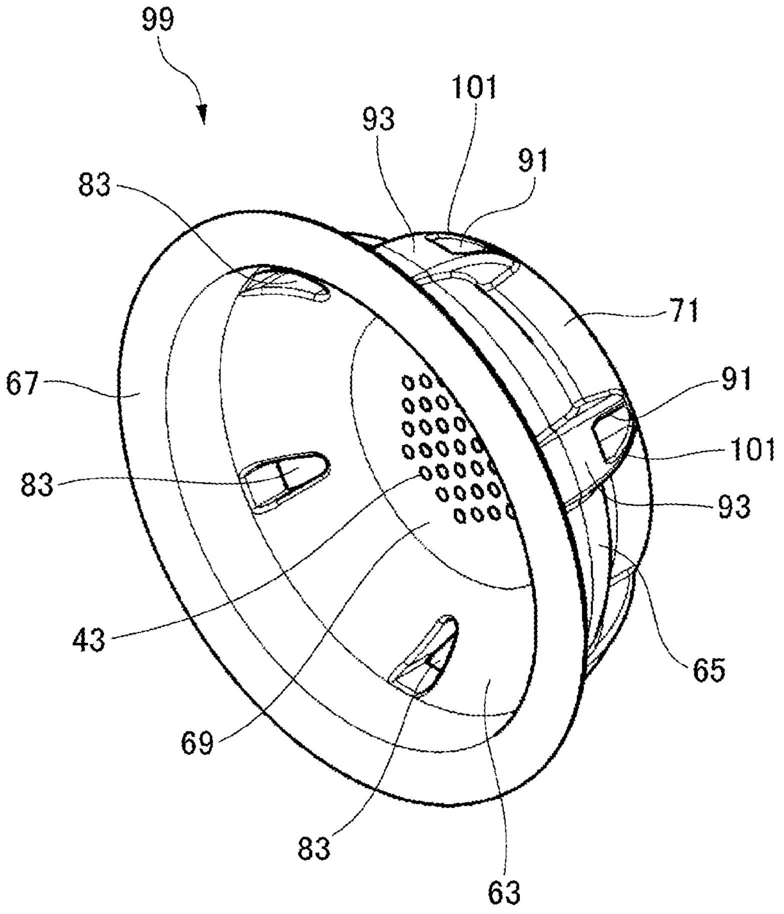
FIG. 20 is a perspective view of an ear pad as viewed from the cup portion side according to a third modification.

FIG. 20 is a perspective view of an ear pad 99 as viewed from the cup portion side according to the third modification. The ear pad 99 according to the third modification includes the cup portion 65 configured to cover the entire auricle 61 (see FIG. 21) of the employee (an example of the wearer) when the entire auricle 61 is inserted into the inner diameter portion 63. The inner diameter portion 63 has the bottom portion 69 on the side opposite to the cup opening 67. The cup portion 65 has the bottomed cylindrical shape whose diameter is gradually increased from the bottom portion 69 toward the cup opening 67. That is, the cup portion 65 has a bowl shape or a mortar shape. In the ear pad 99, the cylindrical housing mounting portion 71 is continuously formed on the side opposite to the cup opening 67 sandwiching the bottom portion 69 with the cup opening 67. In the ear pad 99, the cup portion 65, the bottom portion 69, and the housing mounting portion 71 are integrally molded. Examples of a molding material for the ear pad 99 include silicone rubber, urethane rubber, and natural rubber. As these materials, the soft material having the hardness of about 60° is preferably used.

Figure 21:
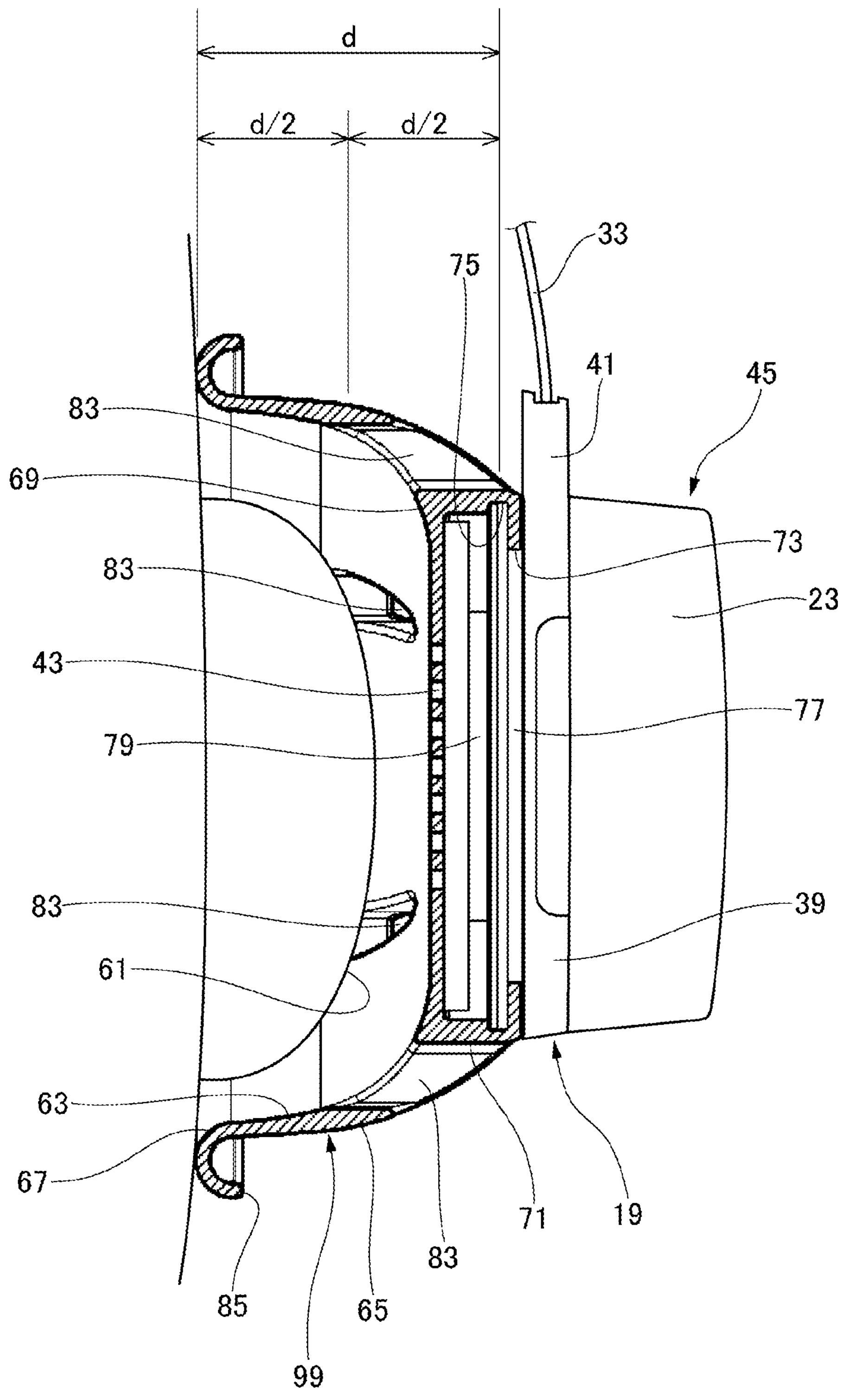
FIG. 21 is a partial cutaway cross-sectional view of the ear pad of the headset disposed on the side head portion with the auricle inserted into the ear pad according to the third modification.

FIG. 21 is a partial cutaway cross-sectional view of the ear pad 99 of the headset 11 disposed on the side head portion with the auricle 61 inserted into the ear pad 99 according to the third modification. The housing mounting portion 71 has the mounting opening 73 on the side opposite to the bottom portion 69. That is, the bottom portion 69 is the partition wall between the inner diameter portion 63 and the housing mounting portion 71. The housing mounting portion 71 is formed with the peripheral groove 75 on the inner circumferential surface on the rear side (bottom side) relative to the mounting opening 73. The fixed flange portion 77 of the housing 19 to be inserted from the mounting opening 73 whose diameter is expanded by the elastic deformation can be fitted into the peripheral groove 75. The tubular front portion 79 protrudes from the tip end surface of the fixed flange portion 77. The tubular front portion 79 faces the opening 43 on the bottom portion 69.

The thickness of the cup portion 65 gradually increases from the cup opening 67 toward the housing mounting portion 71. Accordingly, the cup portion 65 is less likely to be crushed. The through hole 83 is open toward the rear side (housing side) in the thick portion. In the ear pad 99 according to the third modification, since the opening 43 (speaker hole) and the through hole 83 are in the same direction, the speaker sound and the external sound are less likely to cause the sense of discomfort.

Figure 22:
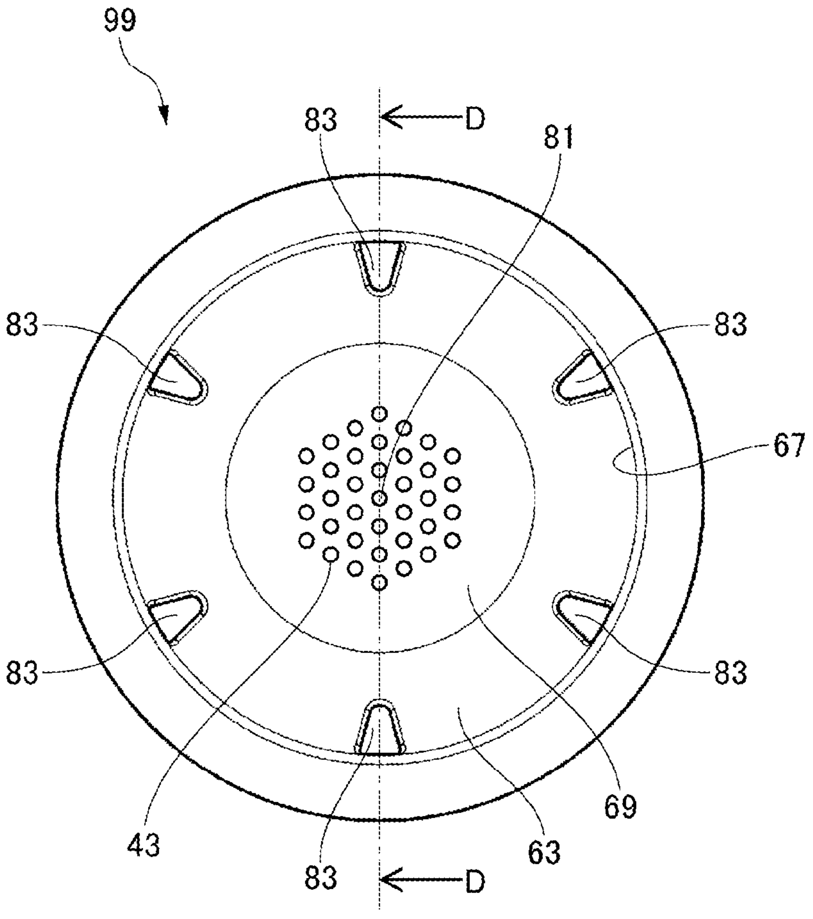
FIG. 22 is a front view of the ear pad as viewed from the opening side according to the third modification.

FIG. 22 is a front view of the ear pad 99 as viewed from the opening side according to the third modification. The bottom portion 69 is formed in a disk shape. The bottom portion 69 is provided with the plurality of openings 43 for outputting voice from the speaker to the inner diameter portion 63 in a concentrated manner in the central portion. For example, 37 openings 43 are arranged in the hexagonal shape around the bottom center 81. Accordingly, the ear pad 21 can output the speaker sound from the tubular front portion 79 through the openings 43 to the inner diameter portion 63.

A plurality of through holes 83 of the ear pad 99 according to the third modification are provided at equal intervals in the circumferential direction centered on the bottom center 81 of the cup portion 65 so as to surround the opening 43. The through hole 83 of the ear pad 99 according to the third modification is formed, for example, in a substantially triangular shape in which an inner side in the radial direction of the inner diameter portion 63 is a vertex portion. For example, six through holes 83 of the ear pad 99 according to the third modification are disposed. The shape and the number of the through holes 83 are not limited thereto.

Figure 23:
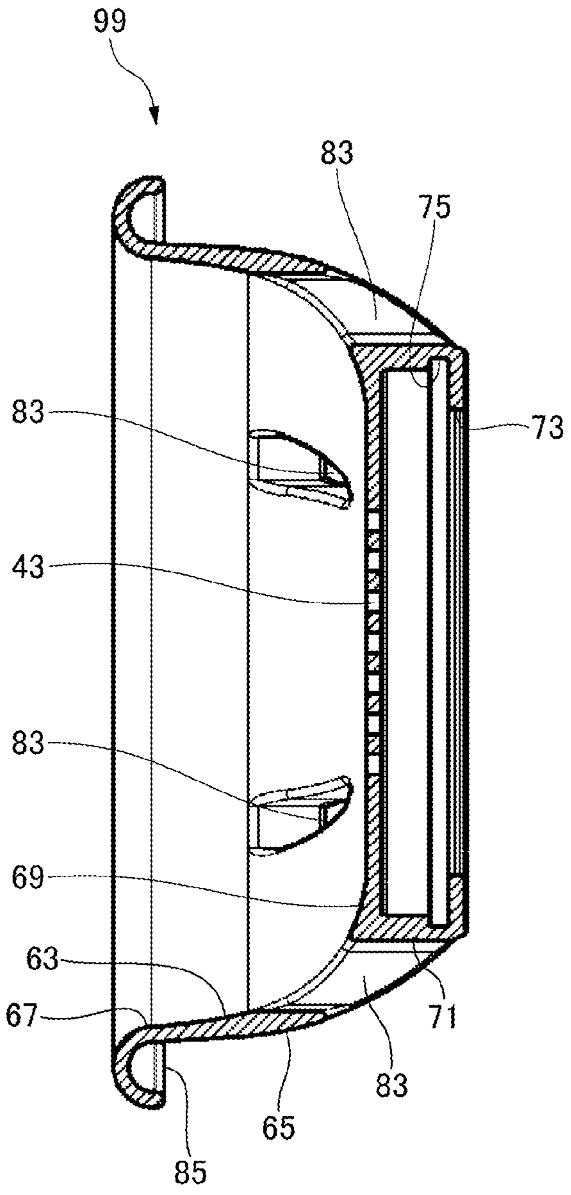
FIG. 23 is a cross-sectional view taken along a line D-D of FIG. 22.

FIG. 23 is a cross-sectional view taken along a line D-D of FIG. 22. The plurality of through holes 83 allowing the inner diameter portion 63 to be open to the outside are formed closer to the housing 19 than the cup opening 67. The through hole 83 of the ear pad 99 according to the third modification is provided on the housing side with respect to the intermediate position (d/2) of the distance d (see FIG. 21) between the housing 19 and the cup opening 67. That is, the through hole 83 of the ear pad 99 according to the third modification is closer to the bottom portion 69 than the cup opening 67 of the inner diameter portion 63.

The ear pad 99 has the curved portion 85 around the cup opening 67. The curved portion 85 is continuous with the cup opening 67 and is curved outward with the curved surface having the C-shaped cross section. In the cup portion 65, the cup opening 67 in which the auricle 61 is inserted into the inner diameter portion 63 contacts the skin of the side head portion on the curved surface. The curved portion 85 shows an example of being curved in the C-shaped cross section, but the curved portion 85 may be wound in a spiral shape (that is, curled).

Figure 24:
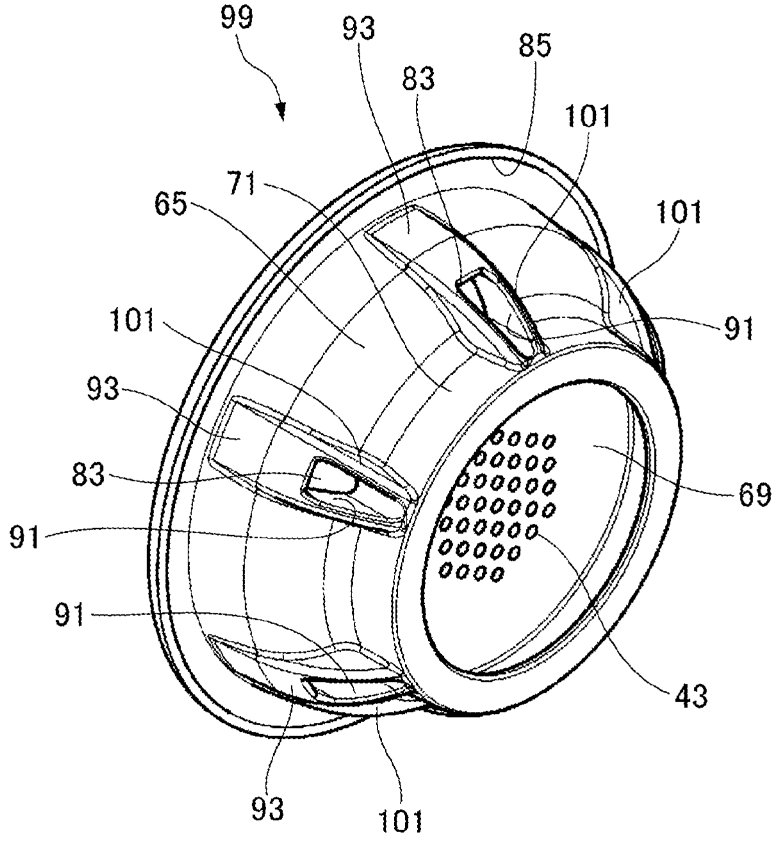
FIG. 24 is a perspective view of the ear pad as viewed obliquely from the upper rear position according to the third modification.

FIG. 24 is a perspective view of the ear pad 99 as viewed obliquely from the upper rear position according to the third modification. In the ear pad 99 according to the third modification, a plurality of ribs 101 are provided on the outer circumferential surface of the cup portion 65. The rib 101 protrudes from the outer circumferential surface so as to surround the through hole 83. In the rib 101, a pair of parallel standing walls protruding from the outer circumferential surface of the cup portion 65 sandwiching the through hole 83 are formed from the housing mounting portion 71 toward the vicinity of the curved portion 85. Distal ends of the pair of ribs 101 are connected to each other by the bridge portion 93, except that the vicinity of the housing mounting portion 71 is the opening portion 91. That is, the rib 101 allows the through hole 83 to be open to the outside from the opening portion 91 toward the rear side (housing side). The rib 101 is different from the rib 89 of the ear pad 87 according to the first modification in that the surrounding through hole 83 is substantially triangular, a separating distance between the pair of standing walls that protrude in parallel to each other is small, and the opening portion 91 is elongated along the radial direction of the cup portion 65.

Figure 25:
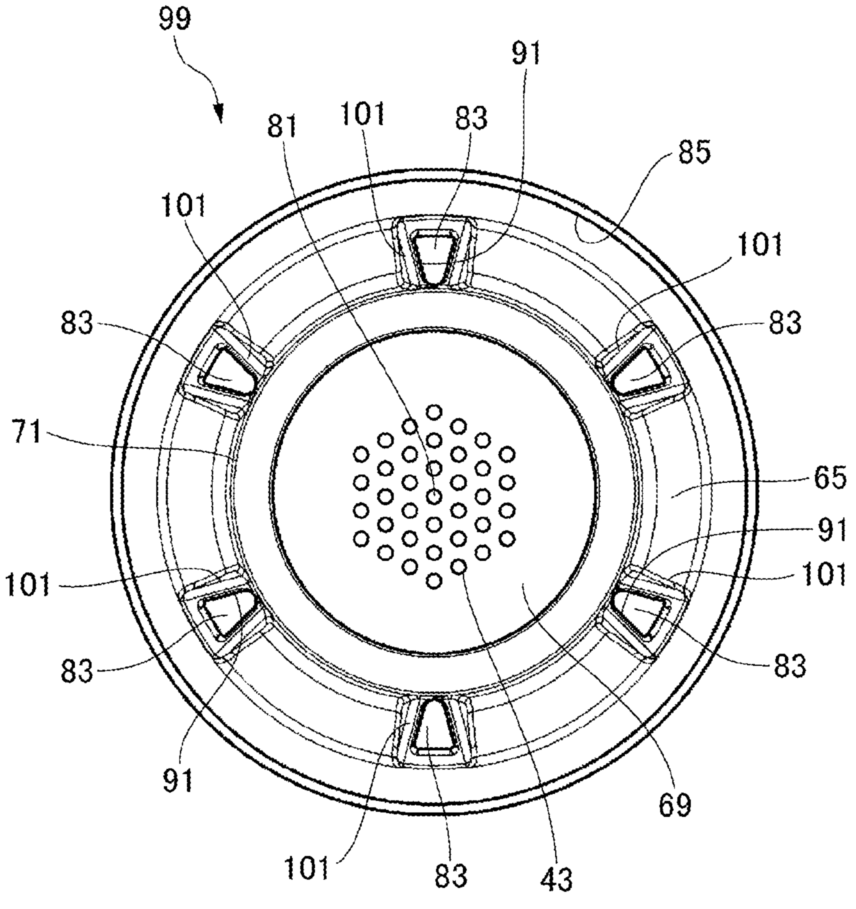
FIG. 25 is a rear view of the ear pad according to the third modification.

FIG. 25 is a rear view of the ear pad 99 according to the third modification. The ribs 101 are radially formed around the bottom center 81 of the cup portion 65. For example, six ribs 101 are provided in the circumferential direction, but the number of the ribs 101 is not limited thereto. The number of the ribs 101 may be, for example, three, five, four, seven, eight, or the like as long as the number of ribs 101 corresponds to the number of the through holes 83.

The rib 89, the rib 97, and the rib 101 shown in the first modification, the second modification, and the third modification may be formed on the ear pad 21 according to the first embodiment.

[Effect]

Next, an operation of an above configuration will be described.

Although each configuration of the ear pad 87 according to the first modification, the ear pad 95 according to the second modification, and the ear pad 99 according to the third modification is included, the ear pad 21 is described as a representative example in the following description in the first embodiment.

The headset 11 according to the first embodiment includes the housing 19 provided at the one end portion 33 of the headband 31, the boom main body 23 attached to the housing 19, and the ear pad 21 attached to the housing 19 on a side opposite to the boom main body 23. The ear pad 21 includes the cup portion 65 configured to cover the entire auricle 61 of the employee (an example of the wearer) when the entire auricle 61 is inserted into the inner diameter portion 63. In the cup portion 65, the plurality of through holes 83 allowing the inner diameter portion 63 to be open to the outside are formed closer to the housing 19 than the cup opening 67.

In the headset 11 according to the first embodiment, the ear pad 21 includes the cup portion 65. The cup portion 65 has the bottomed cylindrical shape whose diameter is gradually increased from the bottom portion 69 toward the cup opening 67. That is, the cup portion 65 has a bowl shape or a mortar shape. The cup portion 65 has the plurality of through holes 83 for opening the inner diameter portion 63 to the outside. In the ear pad 21, the auricle 61 is inserted into the inner diameter portion 63, and the cup opening 67 is pressed against the side head portion, so that the cup opening 67 is closed.

In this state, in the ear pad 21, the cup opening 67 is closed, and the inner diameter portion 63 is open to the outside by the through hole 83. Since the plurality of through holes 83 are provided, air flowing in from some of the through holes 83 flows out from other through holes 83. That is, ventilation is improved, moist air is discharged to the outside, and stuffiness is less likely to occur.

In the current ear pad, when the cup opening 67 is closed, the inner diameter portion 63 becomes an enclosed space. This enclosed space leads to an eardrum via an ear canal. A space on a rear side of the eardrum is a middle ear. When the ear is covered by the cup portion 65 and a tip of the ear canal becomes an enclosed space, a feeling of clogging (feeling of blockage) of the ear may occur. In the cup portion 65 which is an enclosed space, an air pressure of the inner diameter portion 63 may be higher than that of the middle ear when the button on the housing 19 is pressed. When the button is repeatedly pressed, a fluctuation of the air pressure in the inner diameter portion 63 also increases. Therefore, there is a possibility that an air pressure balance between the inner diameter portion 63 and an inside of the middle ear is lost and the eardrum is compressed, and discomfort or pain such as clogging of the ear may occur. Although the middle ear is connected to nasopharynx by an ear tube and a pressure of the middle ear is adjusted to be constant, if the button is pressed frequently, discomfort or pain is likely to occur.

In contrast, in the ear pad 21 according to the first embodiment, even when the cup opening 67 is closed, air flows back and forth through the through hole 83 to the outside, so that the above discomfort or pain such as clogging of the ear does not occur. Accordingly, a sense of auditory obstruction due to the auricle 61 being covered with the enclosed space and a deterioration of hearing due to compression of the eardrum do not occur. The speaker sound emitted from the housing side is also less likely to be muffled.

Since the headset 11 is provided with the through hole 83 in the ear pad 21, a sound from the outside is easily heard. Accordingly, with the headset 11, a direct call sound with another employee can also be easily heard while listening to the speaker sound.

Further, the ear pad 21 is disposed such that the through hole 83 is close to the housing 19. That is, the through hole 83 is provided on the housing side with respect to the intermediate position (d/2) of the distance d between the housing 19 and the cup opening 67. That is, the through hole 83 is disposed in the vicinity of the bottom portion 69 that is a center side of the cup portion 65. Accordingly, the through hole 83 is less likely to be covered by the auricle 61 even in a case where the ear pad 21 is used by a person having a larger proportion of the auricle 61 in the inner diameter portion 63 than usual.

In the headset 11, the through holes 83 are provided at equal intervals in the circumferential direction of the cup portion 65.

In this headset 11, the through holes 83 are provided at equal intervals in the circumferential direction of the cup portion 65. Accordingly, a strong bias is less likely to occur in the circumferential direction of the cup portion 65. In the headset 11, a plurality of buttons such as the talk button 47 and the shift button 53 are provided on the surface of the boom main body 23. A load caused by the pressing the button is transmitted to the ear pad 21 via the housing 19, and a pressing load is received by the side head portion of the employee wearing the headset 11. That is, a compressive load in a direction along a central axis of the cup portion 65 is applied to the ear pad 21.

The cup portion 65 is provided with the through holes 83 at equal intervals in the circumferential direction of the cup portion 65, so that when this compressive load is applied, a fragile portion is not displaced to a portion in the circumferential direction. Therefore, it is possible to prevent a stress from being concentrated on a part in the circumferential direction and the part from being easily crushed first. As a result, even if a plurality of through holes 83 having a relatively small diameter are bored in a portion close to the housing 19 to reduce a thickness, the pressing load of the button can be uniformly distributed in the circumferential direction, and the ear pad 21 can be prevented from being crushed.

In the headset 11, the ribs (for example, the ribs 89, the ribs 97, or the ribs 101) that surround the through hole 83 and protrudes from the outer circumferential surface of the cup portion 65 are radially formed around the bottom center 81 of the cup portion 65 on the outer circumferential surface of the cup portion 65.

In the headset 11, the rib that surrounds the through hole 83 protrudes from the outer circumferential surface of the cup portion 65. The rib is integrally molded with the cup portion 65, for example. The ear pad 21 is made of, for example, silicon rubber. In the ear pad 21 (the ear pad 87, the ear pad 95, and the ear pad 99), the rib is provided in the vicinity of the cup portion 65 so as to surround the through hole 83, so that a side wall portion of the cup portion 65 whose strength is reduced due to formation of the through hole 83 is reinforced by the rib. Accordingly, a rigidity of the side wall portion of the cup portion 65 is increased, and the cup portion 65 is less likely to be crushed in addition to an uniform arrangement of the above through holes 83 in the circumferential direction. As a result, in the ear pad 21 (the ear pad 87, the ear pad 95, and the ear pad 99), the cup portion 65 is less likely to be crushed even when the pressing load is applied by pressing various buttons provided on the surface of the boom main body 23.

In the headset 11, the cup portion 65 has the curved portion 85 curved outward with the curved surface around the cup opening 67 in the inner diameter portion 63.

In the headset 11, the cup portion 65 has the curved portion 85 in the cup opening 67. In the cup portion 65, an opening side opposite to the bottom portion 69 of the inner diameter portion 63 into which the auricle 61 is inserted is the cup opening 67. The entire ear pad 21, including the cup portion 65, is integrally molded with silicone rubber.

For example, in the cup portion 65, the side wall portion has a bowl shape having a uniform thickness, and when there is no curved portion 85, a periphery of the cup opening 67 becomes an outer diameter peripheral edge and an inner diameter peripheral edge of a concentric circle. An annular flat surface is formed between the outer diameter peripheral edge and the inner diameter peripheral edge. A distance in the radial direction between the outer diameter peripheral edge and the inner diameter peripheral edge is a thickness of the side wall portion. That is, the outer diameter peripheral edge is connected to the side wall portion, and the inner diameter peripheral edge is connected to the inner diameter portion 63. In this case, an outer circumferential surface of the side wall portion and the annular flat surface are edges, an angle at which the outer circumferential surface of the side wall portion and the annular flat surface intersect is approximately 90°, the annular flat surface and an inner circumferential surface of the inner diameter portion 63 are edges, and an angle at which the annular flat surface and the inner circumferential surface of the inner diameter portion 63 intersect is also approximately 90°. Since the ear pad 21 has edges on an outer circumferential side and an inner circumferential side of the cup opening 67, stress tends to be concentrated on the skin at the time of wearing, and a wearing feeling is uncomfortable (pain is likely to occur). In addition, if the periphery of the cup opening 67 is the annular flat surface, a gap is likely to occur at the time of contact with the skin.

In contrast, since the ear pad 21 has the curved portion 85 curved outward with the curved surface at the cup opening 67, when the curved surface is pressed, the inner circumferential surface of the inner diameter portion 63 is deformed so as to gradually increase a contact area in accordance with compressive deformation, and is brought into close contact with the skin. Therefore, the ear pad 21 gives a comfortable touch to skin (easily fits on the skin) than in a case where the cup opening 67 has the edge. In addition, since the ear pad 21 is easily deformed in a diameter expanding direction as compared with the case where the cup opening 67 has the edge, it is possible to prevent a part of the cup opening 67 from being deformed in a diameter reducing direction and prevent an occurrence of the gap. That is, irregular deformation such that a part of the side wall portion collapses toward an inner diameter portion side is prevented.

The ear pad 21 according to the first embodiment is the ear pad 21 mountable to the housing 19 of the headband 31, and includes the cup portion 65 attachable to the housing 19 and configured to cover the entire auricle 61 when the entire auricle 61 is inserted into the inner diameter portion 63. In the cup portion 65, the plurality of through holes 83 that allows the inner diameter portion 63 to be open to the outside are formed closer to the housing 19 than the cup opening 67 of the inner diameter portion 63.

In the ear pad 21 according to the first embodiment, the cup portion 65 has the bottomed cylindrical shape whose diameter is gradually increased from the bottom portion 69 toward the cup opening 67. That is, the cup portion 65 has a bowl shape or a mortar shape. The cup portion 65 has the plurality of through holes 83 for opening the inner diameter portion 63 to the outside. In the ear pad 21, the auricle 61 is inserted into the inner diameter portion 63, and the cup opening 67 is pressed against the side head portion, so that the cup opening 67 is closed.

In this state, in the ear pad 21, the cup opening 67 is closed, and the inner diameter portion 63 is open to the outside by the through hole 83. Since the plurality of through holes 83 are provided, the air flowing in from some of the through holes 83 flows out from other through holes 83. That is, the ventilation is improved, the moist air is discharged to the outside, and the stuffiness is less likely to occur.

In the current ear pad, when the cup opening 67 is closed, the inner diameter portion 63 becomes an enclosed space. This enclosed space leads to the eardrum via the ear canal. The space on the rear side of the eardrum is the middle ear. When the ear is covered by the cup portion 65 and the tip of the ear canal becomes an enclosed space, the feeling of clogging (feeling of blockage) of the ear may occur. In the cup portion 65 which is an enclosed space, the air pressure of the inner diameter portion 63 may be higher than that of the middle ear when the button of the headset 11 is pressed. When the button is repeatedly pressed, the fluctuation of the air pressure in the inner diameter portion 63 also increases. Therefore, there is a possibility that the air pressure balance between the inner diameter portion 63 and the inside of the middle ear is lost and the eardrum is compressed, and discomfort or pain such as clogging of the ear may occur. Although the middle ear is connected to the nasopharynx by the ear tube and the pressure of the middle ear is adjusted to be constant, if the button is pressed frequently, discomfort or pain is likely to occur.

In contrast, in the ear pad 21, even when the cup opening 67 is closed, the air flows back and forth through the through hole 83 to the outside, so that the above discomfort or pain such as the clogging of the ear does not occur. Accordingly, the sense of auditory obstruction due to the auricle 61 being covered with the enclosed space and the deterioration of hearing due to compression of the eardrum do not occur. The speaker sound emitted from the housing side is also less likely to be muffled.

Since the ear pad 21 is provided with the through hole 83, a sound from the outside is easily heard. Accordingly, with the ear pad 21, a direct call sound with another employee can also be easily heard while listening to the speaker sound.

Further, the ear pad 21 is disposed such that the through hole 83 is close to the housing 19. That is, the through hole 83 is provided on the housing side with respect to the intermediate position (d/2) of the distance d between the housing 19 and the cup opening 67. That is, the through hole 83 is disposed in the vicinity of the bottom portion 69 that is the center side of the cup portion 65. Accordingly, the through hole 83 is less likely to be covered by the auricle 61 even in the case where the ear pad 21 is used by the person having a larger proportion of the auricle 61 in the inner diameter portion 63 than usual.

Therefore, according to the headset 11 and the ear pad 21 according to the first embodiment, an internal space of the ear pad 21 is less likely to get stuffy even in long-term use.

Although various embodiments have been described above with reference to the accompanying drawings, the present disclosure is not limited to these embodiments. It will be apparent to those skilled in the art that various changes, modifications, substitutions, additions, deletions, and equivalents can be conceived within the scope of the claims, and it should be understood that such changes and the like also belong to the technical scope of the present disclosure. Components in the various embodiments described above may be combined optionally in the range without deviating from the spirit of the invention.

The present disclosure is useful as a headset and an ear pad in which even in long-term use, an internal space of the ear pad is less likely to get stuffy and a deterioration in a wearing feeling of a user is prevented.

The invention claimed is:

1. A headset comprising:

a housing provided at one end portion of a headband;

a boom main body attached to the housing; and an ear pad attached to the housing on a side opposite to the boom main body, wherein the ear pad comprises a cup portion configured to cover an entire auricle of a wearer when the entire auricle is inserted into an inner diameter portion of the cup portion, and wherein in the cup portion, a plurality of through holes allowing the inner diameter portion to be open to an outside are formed closer to the housing than a cup opening of the inner diameter portion, wherein the plurality of through holes are provided at equal intervals in a circumferential direction of the cup portion, and wherein on an outer circumferential surface of the cup portion, ribs are radially formed around a bottom center of the cup portion, the ribs surrounding the plurality of through holes, respectively, and protruding from the outer circumferential surface.

2. The headset according to claim 1, wherein the cup portion comprises a curved portion curved outward with a curved surface around the cup opening in the inner diameter portion.

* * * * *